US008680183B2

(12) United States Patent
Schambony et al.

(10) Patent No.: US 8,680,183 B2
(45) Date of Patent: Mar. 25, 2014

(54) LIQUID STABILIZER MIXTURE

(75) Inventors: Simon Schambony, Ludwigshafen (DE); Jochen Fink, Nussloch (DE); Bernd Bruchmann, Freinsheim (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 13/362,281

(22) Filed: Jan. 31, 2012

(65) Prior Publication Data

US 2012/0129987 A1 May 24, 2012

Related U.S. Application Data

(63) Continuation of application No. 12/743,071, filed as application No. PCT/EP2008/066050 on Nov. 24, 2008, now abandoned.

(30) Foreign Application Priority Data

Nov. 28, 2007 (EP) .................................... 07121782

(51) Int. Cl.
C08K 5/00 (2006.01)
C08K 5/16 (2006.01)
C08K 5/34 (2006.01)
C08G 18/28 (2006.01)
C08G 67/02 (2006.01)

(52) U.S. Cl.
USPC ............. 524/91; 524/102; 524/198; 524/208; 524/590; 524/612

(58) Field of Classification Search
USPC .................... 524/91, 102, 198, 208, 590, 612
See application file for complete search history.

(56) References Cited

U.S. PATENT DOCUMENTS

| | | | |
|---|---|---|---|
| 4,325,863 A | 4/1982 | Hinsken et al. | |
| 4,338,244 A | 7/1982 | Hinsken et al. | |
| 5,124,380 A | 6/1992 | Gay et al. | |
| 5,145,893 A | 9/1992 | Galbo et al. | |
| 5,175,312 A | 12/1992 | Dubs et al. | |
| 5,216,052 A | 6/1993 | Nesvadba et al. | |
| 5,252,643 A | 10/1993 | Nesvadba | |
| 5,844,029 A | 12/1998 | Prabhu et al. | |
| 5,880,191 A | 3/1999 | Prabhu et al. | |
| 2004/0156933 A1 | 8/2004 | McNamara et al. | |
| 2008/0027182 A1 | 1/2008 | McNamara et al. | |
| 2008/0081025 A1 | 4/2008 | Poschalko et al. | |

FOREIGN PATENT DOCUMENTS

| | | |
|---|---|---|
| DE | 1 543 178 | 7/1969 |
| DE | 1 670 666 | 7/1971 |
| DE | 28 08 801 | 9/1978 |
| DE | 29 16 201 | 10/1980 |
| DE | 34 03 277 | 8/1985 |
| DE | 38 10 908 | 10/1988 |
| DE | 43 16 611 | 11/1993 |
| DE | 43 16 622 | 11/1993 |
| DE | 43 16 876 | 11/1993 |
| DE | 197 34 048 | 2/1999 |
| DE | 101 38 216 | 2/2003 |
| DE | 101 47 712 | 4/2003 |
| EP | 0 496 208 | 7/1992 |
| EP | 0 524 500 | 1/1993 |
| EP | 0 524 501 | 1/1993 |
| EP | 0 589 839 | 3/1994 |
| EP | 0 591 102 | 4/1994 |
| EP | 0 825 211 | 2/1998 |
| EP | 0 916 335 | 5/1999 |
| EP | 1 122 273 | 8/2001 |
| EP | 1 191 041 | 3/2002 |
| EP | 1 060 225 | 9/2005 |
| EP | 1 363 883 | 4/2006 |
| GB | 994 890 | 6/1965 |
| JP | 4-230364 | 8/1992 |
| JP | 9-208927 | 8/1997 |
| JP | 2003-509555 | 3/2003 |
| WO | WO 01/19897 | 3/2001 |
| WO | 02 092668 | 11/2002 |
| WO | 03 018682 | 3/2003 |
| WO | 2004 094505 | 11/2004 |
| WO | 2005 070987 | 8/2005 |
| WO | 2006 013071 | 2/2006 |
| WO | 2006 048206 | 5/2006 |
| WO | 2008 012252 | 1/2008 |

OTHER PUBLICATIONS

International Search Report issued Jul. 21, 2009 PCT/EP08/066050 filed Nov. 24, 2008.
Safety Data Sheet, Tinuvin® 765, BASF, Jul. 7, 2010, version 1.0 (7 pp.).

Primary Examiner — Kriellion Sanders
(74) Attorney, Agent, or Firm — Oblon, Spivak, McClelland, Maier & Neustadt, L.L.P.

(57) ABSTRACT

A mixture comprising
(a) one or more liquid UV absorbers, with the proviso that Tinuvin 384-2 as a liquid UV absorber is excluded,
(b) one or more branched polymers comprising stabilizing groups,
(c) optionally one or more further additions.
Use of such a mixture for stabilizing inanimate organic materials against the effect of light, oxygen and/or heat. Inanimate organic materials comprising at least one such mixture, and also articles produced from such inanimate organic materials. Methods of stabilizing inanimate organic materials against the effect of light, oxygen and/or heat by adding to said inanimate organic materials at least one such mixture in an effective amount.

15 Claims, No Drawings

LIQUID STABILIZER MIXTURE

The invention relates to mixtures which comprise
(a) one or more liquid UV absorbers, with the proviso that Tinuvin 384-2 as a liquid UV absorber is excluded,
(b) one or more branched polymers comprising stabilizing groups,
(c) optionally one or more further additions.

The present invention additionally discloses methods of stabilizing inanimate organic materials, more particularly plastics, against the effect of light, oxygen and/or heat, using this mixture. The invention further relates to articles produced from inanimate organic materials thus stabilized.

Further embodiments of the present invention are evident from the claims, the description, and the examples. It is understood that the features of the inventive subject matter that are specified above, and those still to be elucidated below, can be used not only in the specific combination in which they are given in each case, but also in other combinations as well, without departing the scope of the invention. Preference, and very great preference, respectively, is also given more particularly to those embodiments of the present invention in which all of the features of the inventive subject matter have the preferred and, respectively, very preferred definitions.

Inanimate organic materials, more particularly plastics, are known to be destroyed, often rapidly, by the action especially of light, oxygen and/or heat. This destruction is typically manifested in yellowing, discoloration, cracking or embrittlement of the material. The aim of stabilizers, such as light stabilizers, for example, is therefore to obtain satisfactory protection against the destruction of inanimate organic material by light, oxygen and/or heat.

Derivatives of 2,2,6,6-tetraalkylpiperidine have been employed commercially for approximately three decades, under the name HALS (Hindered Amine Light Stabilizers), as light stabilizers and as stabilizers, more particularly for plastics and coating materials.

It is also known to the skilled worker that mixtures of two or more stabilizers, such as antioxidants, HALS compounds and/or UV absorbers, for example, can be employed for the purpose of stabilizing polymers.

EP 1 363 883 B1 discloses stabilizers which comprise HALS compounds. They are used for stabilizing polymers. That specification also describes compositions which among other components may also comprise UV absorbers.

EP 1 060 225 B1 describes a process for preparing liquid polyfunctional additives. These polyfunctional additives are used for stabilizing organic material, polymers for example. Besides the polyfunctional additives the stabilized materials may additionally comprise further additives, such as UV absorbers, for example.

WO 02/092668 A1 describes additives which comprise known polymer additives in the form of groups attached chemically to hyperbranched or dendritic polymers or copolymers. These polymer additives may be UV absorbers or else HALS compounds, for example. That specification also discloses compositions comprising these stabilizers. Furthermore, these compositions may also comprise other conventional additives, such as UV absorbers or light stabilizers, for example.

WO 2004/094505 A1 discloses stabilizers composed of highly branched polymers having functional groups, as a highly branched anchor group, and one or more stabilizing groups, which protect plastics against damage due to heat, UV radiation, oxidation, hydrolysis or mechanical exposure during processing, the stabilizing groups being coupled to the anchor group via functional groups which are able to react with the functional groups of the highly branched polymers.

WO 2005/070987 A1 discloses stabilizers composed of one or more polyisocyanates having on average 2 to 10 isocyanate groups per molecule and, per mole of isocyanate groups, 0.1 to 1.0 mol of one or more stabilizing groups, which protect plastics against damage due to heat, UV radiation, oxidation, hydrolysis or mechanical exposure during processing, the stabilizing groups being coupled to the polyisocyanates via functional groups which are able to react with the isocyanate groups. The stabilizing groups are selected from phenols, sterically hindered amines (HALS compounds), benzotriazoles, benzophenones, aromatic amines, and phosphites.

Our unpublished international application PCT/EP2007/057427 describes branched additives which can be used as stabilizers in polymers. The branched additives of PCT/EP2007/057427 may comprise HALS compounds and are used for stabilizing thermoplastics and thermosets against, for example, oxidative, thermal or radiation-induced degradation.

The stabilized thermoplastic molding compounds disclosed in WO 2006/048206 A1 may comprise branched stabilizers having HALS groups.

Although these compounds and mixtures are already established in commercial practice, there nevertheless remains room for improvements, more particularly in respect of the handling of the stabilizers and the miscibility of the stabilizers with the compounds that are to be stabilized. Oftentimes it is the case that stabilizers or their mixtures are solid substances, which frequently, in the form of powders, are not easy to meter. In certain cases, furthermore, it is difficult to incorporate solid stabilizers into the materials to be stabilized while achieving a homogeneous distribution of the stabilizers. In these cases it is frequently necessary to disperse or dissolve the stabilizers in a solvent. That approach, however, entails additional worksteps. Moreover, dissolved or dispersed stabilizers have lower concentrations of effective compound and their transportation is therefore unfavorable. Frequently moreover, liquid components are already used in the preparation or processing of the material to be stabilized (examples being polyols in the preparation of polyurethanes, or plasticizers in the processing of plastics). In this case, of course, the admixing of a liquid additive is particularly beneficial.

It was an object of the present invention, therefore, to provide mixtures which are easy to handle and easy to incorporate into the materials to be stabilized. A further object of the invention was to provide liquid stabilizer mixtures which can be incorporated in liquid form into the materials to be stabilized, do not have any tendency to migrate from the stabilized materials, and at the same time exhibit a low volatility. A further sub-object of the present invention was to provide mixtures, more particularly liquid mixtures, which have a high stabilizer concentration and can also be transported economically. A further object of the invention was to provide mixtures which efficiently stabilize materials against the effect of light, oxygen and/or heat.

Accordingly, the mixtures described at the outset have been found.

For the purposes of this invention, expressions of the form $C_a$-$C_b$ identify chemical compounds or substituents having a particular number of carbon atoms. The number of carbon atoms can be selected from the entire range from a to b, including a and b; a is at least 1 and b is always greater than a. The chemical compounds or substituents are further particularized by expressions of the form $C_a$-$C_b$ V. V here is a chemical class of compound or substituent, and represents alkyl compounds or alkyl substituents, for example.

Halogen is fluorine, chlorine, bromine or iodine, preferably fluorine, chlorine or bromine, more preferably fluorine or chlorine.

Heteroatoms are preferably oxygen, nitrogen, sulfur or phosphorus.

The various collective terms indicated have the following particular definition unless otherwise indicated:

$C_1$-$C_{30}$ alkyl: straight-chain or branched hydrocarbon radicals having up to 30 carbon atoms, examples being $C_1$-$C_{18}$ alkyl, $C_1$-$C_{10}$ alkyl or $C_{11}$-$C_{20}$ alkyl, preferably $C_1$-$C_{10}$ alkyl, e.g., $C_1$-$C_6$ alkyl, $C_1$-$C_4$ alkyl, $C_1$-$C_3$ alkyl, such as methyl, ethyl, n-propyl, isopropyl, or $C_4$-$C_6$ alkyl, n-butyl, sec-butyl, 1,1-dimethylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methyl-pentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethyl-propyl, 1,2,2-trimethylpropyl, 1-ethyl-1-methylpropyl, 1-ethyl-2-methylpropyl, or $C_7$-$C_{10}$ alkyl, such as heptyl, octyl, 2-ethylhexyl, 2,4,4-trimethylpentyl, 1,1,3,3-tetramethylbutyl, nonyl or decyl (e.g., 2-propylheptyl), and also their isomers.

$C_2$-$C_{22}$ alkenyl: unsaturated, straight-chain or branched hydrocarbon radicals having 2 to 22 carbon atoms and at least one double bond, preferably one double bond, in any desired position, examples being $C_2$-$C_{10}$ alkenyl or $C_{11}$-$C_{22}$ alkenyl, preferably $C_2$-$C_{10}$ alkenyl such as $C_2$-$C_4$ alkenyl, such as ethenyl, 1-propenyl, 2-propenyl, 1-methyl-ethenyl, 1-butenyl, 2-butenyl, 3-butenyl, 1-methyl-1-propenyl, 2-methyl-1-propenyl, 1-methyl-2-propenyl, 2-methyl-2-propenyl, or $C_5$-$C_6$ alkenyl, such as 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl, and also $C_7$-$C_{10}$ alkenyl, such as the isomers of heptenyl, octenyl, nonenyl or decenyl.

$C_3$-$C_{15}$ cycloalkyl: monocyclic, saturated hydrocarbon groups having 3 up to 15 carbon ring members, preferably $C_3$-$C_8$ cycloalkyl such as cyclopropyl, cyclobutyl, cyclopentyl, cyclohexyl, cycloheptyl or cyclooctyl, and also a saturated or unsaturated polycyclic system such as norbornyl or norbenyl, for example. Particular preference is given to $C_5$-$C_6$ cycloalkyl.

Aryl: mono- to tricyclic aromatic ring system comprising 6 to 14 carbon ring members, e.g., phenyl, hydroxyphenyl, naphthyl or anthracenyl, preferably a mono- to dicyclic, more preferably a monocyclic aromatic ring system.

Heterocycles: five- to twelve-membered, preferably five- to nine-membered, more preferably five- to six-membered ring systems containing oxygen, nitrogen and/or sulfur atoms, if appropriate containing two or more rings, such as furyl, thiophenyl, pyrryl, pyridyl, imidazolyl, indolyl, benzoxazolyl, dioxolyl, dioxyl, benzimidazolyl, benzo-thiazolyl, dimethylpyridyl, methylquinolyl, dimethylpyrryl, methoxyfuryl, dimethoxy-pyridyl, difluoropyridyl, methylthiophenyl, isopropylthiophenyl or tert-butylthiophenyl.

$C_1$-$C_{20}$ alkoxy is a straight-chain or branched alkyl group having 1 to 20 carbon atoms (as specified above) which are attached via an oxygen atom (—O—), examples being $C_1$-$C_{10}$ alkoxy such as n-hexoxy, isohexoxy, n-octoxy, 2-ethylhexoxy, and isooctoxy, and additionally also methoxy, ethoxy, n-propoxy, isopropoxy, n-butoxy, isobutoxy, sec-butoxy, tert-butoxy, n-pentoxy, n-nonoxy, n-decoxy, or $C_{11}$-$C_{20}$ alkoxy such as n-undecoxy and n-dodecoxy, preferably $C_1$-$C_{10}$ alkyloxy, more preferably $C_1$-$C_8$ alkoxy, such as methoxy, ethoxy, propoxy or octoxy, for example.

$C_1$-$C_{22}$ alkylene: straight-chain or branched hydrocarbon radicals having 1 to 22 carbon atoms, examples being $C_2$-$C_{10}$ alkylene or $C_{11}$-$C_{22}$ alkylene, preferably $C_2$-$C_{10}$ alkylene, more particularly methylene, dimethylene, trimethylene, tetramethylene, penta-methylene or hexamethylene.

Substances that are "liquid" are substances, in the context of the present application, which at temperatures of 5 to 40° C. and a pressure of 500 to 1500 mbar present as good as no resistance to dimensional change but present extremely great resistance to a volume change. A further feature of the liquid substances is that they have a dynamic viscosity in the range from 1 to 150 000 mPa·s, preferably to 10 000 mPa·s, determined at 23° C. and 1 bar, in accordance for example with DIN 53019.

By "dendrimeric" is meant, in the context of the present invention, that the degree of branching (DB) is 99.9%-100%. On the definition of the degree of branching see H. Frey et al., Acta Polym. 1997, 48, 30.

"Hyperbranched polymers" are molecularly and structurally nonuniform. They differ from linear polymers in that they comprise side groups which are composed of the same monomers as the polymer backbone. They further differ, for example, in their molecular nonuniformity from dendrimers, and are considerably easier to prepare. By "hyperbranched" is also meant, in the context of the present invention, that the degree of branching is 10% to 99.9%, preferably 20% to 99%, more preferably 20% to 95%.

The degree of branching (DB) is defined as $$DB = \frac{T+Z}{T+Z+L} \times 100\%,$$

where T is the average number of terminally bonded monomer units, Z is the average number of monomer units which form branches, and L is the average number of linearly bonded monomer units in the macromolecules of the compounds in question.

"Branched polyisocyanates" for the purposes of this invention are oligomeric and polymeric isocyanates which comprise groups formed by the reaction of polyvalent isocyanates. The groups in question are, for example, urethane, allophanate, urea, biuret, uretdione, amide, isocyanurate, carbodiimide, uretonimine, oxadiazinetrione or iminooxadiazinedione groups, which in some cases lead to branching. The branched polyisocyanates can therefore be characterized as oligomeric or polymeric compounds (dimers, trimers, tetramers or higher multimers) of the polyvalent isocyanates.

"Hyperbranched polycarbonates" for the purposes of this invention are noncrosslinked macromolecules with hydroxyl and carbonate or carbamoyl chloride groups which are both structurally and molecularly nonuniform. In one version of the present invention they may have a composition, starting from a central molecule, analogous with that of dendrimers, but with a nonuniform branch chain length. In another version of the present invention they may be of linear composition, with functional side groups, or else may, as a combination of the two extremes, have linear and branched moieties. On the definition of dendrimeric and hyperbranched polymers see also P. J. Flory, J. Am. Chem. Soc. 1952, 74, 2718 and H. Frey et al., Chem. Eur. J. 2000, 6, no. 14, 2499.

"Branched polymers" may for example be branched polyisocyanates or hyperbranched polycarbonates.

"Stabilizing additives" are known. Their function is to protect compounds against the adverse influence of detrimental environmental effects, caused for example by light, oxygen and/or heat. Examples of such stabilizing additives include antioxidants, hydrolysis inhibitors, quenchers, flame retardants or light stabilizers.

"Stabilizing groups" are frequently based on stabilizing additives. These are the part or parts of the stabilizing additive whose effect on interaction with light, heat, oxygen, peroxides, free radicals and/or other damaging molecules or conditions is to prevent or at least reduce the damage. The stabilizing groups are attached covalently to the branched polymers. Preferably the stabilizing groups are attached covalently to the chain ends of the branched polymers. In principle a branched polymer may comprise one or more stabilizing groups, including different stabilizing groups. The number and the proportion of the stabilizing groups to one another are variable and are limited only by the number of attachment points in the branched polymer (covalent bonds) to the stabilizing groups. In this context, however, it is not necessary for every attachment point to have been reacted with a stabilizing group. Where a branched polymer comprising stabilizing groups (b) is to act, for example, as an antioxidant, that polymer may comprise those stabilizing groups which retard or arrest the oxidative degradation of a plastic.

In the mixtures of the invention, component (a) comprises one or more different liquid UV absorbers.

Liquid UV absorbers are frequently commercial products. They are sold, for example, under the trade name Uvinul® by BASF Aktiengesellschaft, Ludwigshafen. The Uvinul® light stabilizers comprise compounds of the following classes: benzophenones, benzotriazoles, cyanoacrylates, cinnamic esters, para-aminobenzoates, and naphthalimides. Furthermore, other known chromophores are used, examples being hydroxyphenyltriazines or oxalanilides. Compounds of this kind are used, for example, alone or in mixtures with other light stabilizers in cosmetic applications, sun protection products for example, or for stabilizing organic polymers. Preferred liquid UV absorbers are cyanoacrylates, cinnamic esters, benzotriazoles or triazines. Liquid UV absorbers used with particular preference are 2-ethylhexyl 2-cyano-3,3-diphenyl acrylate or 2-ethylhexyl 4-methoxycinnamate. A liquid UV absorber used with very particular preference is 2-ethylhexyl 2-cyano-3,3-diphenylacrylate. A further liquid UV absorber used with very particular preference is 2-ethylhexyl 4-methoxycinnamate.

Further examples of liquid UV absorbers are as follows: 2-ethylhexyl N,N-dimethyl-4-aminobenzoate, 3,3,5-trimethylcyclohexyl salicylate, 2-ethylhexyl salicylate, isoamyl 4-methoxycinnamate, 2-(2H-benzotriazol-2-yl)-6-dodecyl-4-methylphenol, 3-(2H-benzotriazol-2-yl)-5-(1,1-dimethylethyl)-4-hydroxyphenylpropanoic acid $C_{7-9}$ alkyl esters, β-[3-(2H-benzotriazol-2-yl)-4-hydroxy-5-tert-butylphenyl] propanoic acid poly(ethylene glycol) 300 ester, bis{β-[3-(2H-benzotriazol-2-yl)-4-hydroxy-5-tert-butylphenyl]propanoic acid}poly(ethylene glycol) 300 ester.

Further suitable liquid UV absorbers are evident from the text of Cosmetic Legislation, Vol. 1, Cosmetic Products, European Commission 1999, pp. 64-66, hereby expressly incorporated by reference.

Suitable liquid UV absorbers are also described in lines 14 to 30 ([0030]) on page 6 of EP 1 191 041 A2. The skilled worker knows which of these UV absorbers are liquid. This literature reference is hereby incorporated to become part of the disclosure content of the present invention.

The liquid UV absorbers do not comprise Tinuvin 384-2 (95% benzenepropanoic acid, 3-(2H-benzotriazol-2-yl)-5-(1, 1-dimethylethyl)-4-hydroxy-, $C_{7-9}$-branched and linear alkyl esters; 5% 1-methoxy-2-propyl acetate), a UV absorber from Ciba Speciality Chemicals Inc.

Furthermore, in the mixtures of the invention, component (b) is composed of one or more different branched polymers comprising stabilizing groups.

In one preferred embodiment of the mixture of the invention the branched polymers comprising stabilizing groups (b), or mixtures thereof, are liquid.

Branched polymers comprising stabilizing groups (b) are disclosed, for example, as "branched polymeric stabilizers" in WO 2004/094505 A1 (p. 4, l. 12-l. 26). The stabilizers disclosed there are hereby expressly incorporated by reference.

The structure of the branched polymers comprising stabilizing groups (b) is preferably hyperbranched.

Branched polymers comprising stabilizing groups (b) can be prepared, for example, by the general processes described in WO 2004/094505 A1 (p. 8, l. 71-p. 13, l. 33). The preparation processes disclosed therein are expressly incorporated by reference.

With regard to the branched polymers comprising stabilizing groups (b) and their preparation, including more particularly the stabilizing groups described therein (active substance groups, p. 14, l. 1-p. 22, l. 4), the full content of WO 2004/094505 A1 is incorporated by reference. Stabilizing compounds on which the stabilizing groups are based are available commercially or are obtainable from commercially available compounds by means of simple reactions known to the skilled worker.

The mixtures of the invention preferably feature branched polymers comprising stabilizing groups, as component (b), having a number-average molecular weight, Mn, of 100 to 20 000 g/mol, preferably 100-15 000 g/mol, more preferably 100-10 000 g/mol, and very preferably 200-5000 g/mol.

Preferably the mixture of the invention comprises as component (b) branched polymers comprising HALS compounds as stabilizing groups.

In one preferred embodiment of the mixtures of the invention the branched polymers comprising stabilizing groups (b) comprise carbonate groups. In this case the polymers are preferably hyperbranched.

The preparation of the hyperbranched polymers comprising carbonate groups and stabilizing groups (b) can take place by the methods indicated in our international application PCT/EP2007/057427.

In accordance with the specification indicated above, hyperbranched polycarbonates (i.e., hyperbranched polymers comprising carbonate groups) with stabilizing groups can be obtained by reacting (A) at least one compound having at least three alcoholic hydroxyl groups, also referred to below as compound (A) or, in accordance with the number of alcoholic hydroxyl groups, triol (A) or tetrol (A) or pentol (A), for example, with (B) at least one reagent of the formula I, also referred to below as reagent (B),

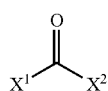

(C) and at least one reagent of the general formula $X^3\text{-}(A^1)_m\text{-}X^4$, also referred to below as reagent (C), the variables being defined as follows:

$X^1$ and $X^2$ are alike or different and are selected from halogen, bromine and chlorine more particularly, $C_1\text{-}C_{20}$ alkoxy, preferably $C_1\text{-}C_6$ alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, more preferably methoxy, ethoxy, n-butoxy, and tert-butoxy;

aryloxy, more particularly phenoxy, 1-naphthoxy, 2-naphthoxy or $C_1\text{-}C_4$ alkyl-substituted $C_6\text{-}C_{10}$ aryloxy, more particularly o-tolyloxy or p-tolyloxy, and O—C(=O)-halogen, more particularly O—C(=O)—Cl;

or $X^1$ and $X^2$ together are a group of the formula O-Q-O, where Q describes an unsubstituted or substituted am-alkylene group, more particularly ethylene.

Particularly preferred reagents (B) are phosgene, ethyl chloroformate, diphosgene and triphosgene, and also dialkyl carbonates or diaryl carbonates, examples being dimethyl carbonate, diethyl carbonate, dibutyl carbonate (di-n-butyl carbonate, di-tert-butyl carbonate), di-tert-butyl dicarbonate, di-tert-butyl tricarbonate, diphenyl carbonate, ditolyl carbonate, diethylene carbonate, ethylene carbonate, and propylene carbonate. Very particular preference is given to dimethyl carbonate, diethyl carbonate, dibutyl carbonate, ethylene carbonate, and propylene carbonate.

Compound (A) is selected from compounds having at least three alcoholic hydroxyl groups, examples being triols (A), tetrols (A) or pentols (A).

Examples of suitable triols (A) are aliphatic, aromatic, and benzylic triols, which may be unalkoxylated or alkoxylated one to 100 times per hydroxyl group, preferably alkoxylated with $C_2\text{-}C_4$ alkylene oxide, such as ethylene oxide, propylene oxide or 1,2-butylene oxide or mixtures of ethylene oxide and propylene oxide and/or butylene oxide, for example, and more particularly alkoxylated with ethylene oxide or propylene oxide.

Mention may be made, by way of example, of the following: glycerol, trimethylol-methane, 1,1,1-trimethylolethane, 1,1,1-trimethylolpropane, 1,2,4-butanetriol, tris(hydroxymethyl)amine, tris(hydroxyethyl)amine, tris(hydroxypropyl)amine, tris(hydroxymethyl) isocyanurate, tris(hydroxyethyl) isocyanurate, phloroglucinol, trihydroxytoluene, trihydroxydimethylbenzene, phloroglucides, 1,3,5-benzene-trimethanol, 1,1,1-tris(4'-hydroxyphenyl)methane, 1,1,1-tris(4'-hydroxyphenyl)ethane, trifunctional or higher polyfunctional polyetherols based on trifunctional or higher polyfunctional alcohols and ethylene oxide, propylene oxide or butylene oxide, or polyesterols. Particular preference here is given to glycerol, 1,1,1-trimethylolpropane, and their polyetherols based on ethylene oxide or propylene oxide.

Preferred examples include glycerol and $(HO\text{—}CH_2)_3C\text{—}X^7$, unalkoxylated or alkoxylated one to a hundred times per hydroxyl group with $C_2\text{-}C_4$ alkylene oxide, $X^7$ being selected from a nitrogen atom and C—$R^6$, and $R^6$ being selected from hydrogen and $C_1\text{-}C_4$ alkyl, such as methyl, ethyl, n-propyl, isopropyl, n-butyl, isobutyl, sec-butyl, and tert-butyl. Very particular preference is given to glycerol, trimethylolethane, trimethylolpropane, 1,2,4-butanetriol, singly to vigintuply alkoxylated glycerol, and singly to vigintuply alkoxylated 1,1,1-trimethylolpropane ($R^6=C_2H_5$), the alkoxylating agents used being preferably ethylene oxide or propylene oxide or mixtures thereof.

Examples of suitable tetrols (A) are pentaerythritol, bis(trimethylolpropane), and diglycerol, which may be unalkoxylated or alkoxylated one to 100 times per hydroxyl group, preferably alkoxylated with $C_2\text{-}C_4$ alkylene oxide, such as ethylene oxide, propylene oxide or 1,2-butylene oxide, or mixtures of ethylene oxide and propylene oxide and/or butylene oxide, for example, and more particularly alkoxylated with ethylene oxide or propylene oxide.

Examples of suitable pentols (A) also comprise compounds having more than 5 alcoholic hydroxyl groups per molecule. These include triglycerol, polyglycerols, hexahydroxybenzene, or sugars, such as sorbose, mannose or glucose, for example, more particularly reduced sugars such as sorbitol, for example, which may be unalkoxylated or alkoxylated one to 100 times per hydroxyl group, preferably alkoxylated with $C_2\text{-}C_4$ alkylene oxide, such as ethylene oxide, propylene oxide or 1,2-butylene oxide or mixtures of ethylene oxide and propylene oxide and/or butylene oxide, for example, and more particularly alkoxylated with ethylene oxide or propylene oxide.

The compound (A) is preferably a trihydric or tetrahydric alcohol, specifically glycerol, TMP (1,1,1-tri(hydroxymethyl)propane, trimethylolpropane, CAS#77-99-6) or pentaerythritol which has been randomly etherified with from 1 to 5 mol of ethylene oxide, propylene oxide, butylene oxide or mixtures thereof per mole of hydroxyl groups of the trihydric or tetrahydric alcohol.

Furthermore, reaction is carried out with at least one reagent of the general formula $X^3\text{-}(A^1)_m\text{-}X^4$, also referred to in the context of the present invention as reagent (C), where $X^3$ is a functional group selected from OH, SH, $NH_2$, NH—$C_1\text{-}C_4$ alkyl, where $C_1\text{-}C_4$ alkyl has been selected from methyl, ethyl, n-propyl, isopropyl, n-butyl, isobutyl, sec-butyl, and tert-butyl, such as NH—$CH_3$, NH—$C_2H_5$, NH-n-$C_3H_7$, NH-iso-$C_3H_7$, NH-n-$C_4H_9$, NH-iso-$C_4H_9$, NH-sec-$C_4H_9$, NH-tert-$C_4H_9$, and also isocyanate, epoxy, examples being

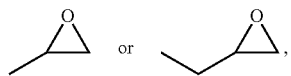

COOH, $COOR^{12}$, C(=O)—O—C(=O), C(=O)—Cl, preferably COOH, $COOR^{12}$, OH, and $NH_2$, $R^{12}$ is $C_1\text{-}C_4$ alkyl or $C_6\text{-}C_{10}$ aryl $A^1$ is a single bond or a spacer, examples of spacers $A^1$ being para-phenylene, meta-phenylene, preferably $C_{20}$ alkylene, preferably $C_2$-$C_{50}$ alkylene, more preferably up to $C_{20}$ alkylene, branched or unbranched, and from one to 6 nonadjacent $CH_2$ groups here can, if appropriate, also have been replaced by, respectively, a sulfur atom, which can also have been oxidized, or by an oxygen atom. The following spacers may be mentioned by way of example:

—$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{12}$—, —$(CH_2)_{14}$—, —$(CH_2)_{16}$—, —$(CH_2)_{18}$—, —$(CH_2)_{20}$—, —$CH_2$—$CH(CH_3)$—, —$CH_2$—$CH(C_2H_5)$—, —$CH_2$—$CH(CH[CH_3]_2)$—, —$CH_2$—$CH(n-C_3H_7)$—, —$[CH(CH_3)]_2$—, —$CH(CH_3)$—$CH_2$—$CH_2$—$CH(CH_3)$—, —$CH(CH_3)$—$CH_2$—$CH(CH_3)$—, —$CH_2$—$C(CH_3)_2$—$CH_2$—, —$CH_2$—$CH(n-C_4H_9)$—, —$CH_2$—$CH(iso-C_3H_7)$—, —$CH_2$—$CH(tert-C_4H_9)$—, —$CH_2$—O—, —$CH_2$—O—$CH_2$—, —$(CH_2)_2$—O—$(CH_2)_2$—, —$[(CH_2)_2$—$O]_2$—$(CH_2)_2$—, —$[(CH_2)_2$—$O]_3$—$(CH_2)_2$—, —$CH_2$—S—, —$CH_2$—S—$CH_2$—, —$(CH_2)_2$—S—$(CH_2)_2$—, —$[(CH_2)_2$—$S]_2$—$(CH_2)_2$—, —$[(CH_2)_2$—$S]_3$—$(CH_2)_2$—, —$CH_2$—SO—$CH_2$—, —$CH_2$—$SO_2$—$CH_2$—, very particularly preferred spacers being $C_1$-$C_{10}$ alkylene groups, branched or unbranched, such as —$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, m is zero or one, $X^4$ is a group selected from phenol groups, benzophenones, aromatic amines, and nitrogen-comprising heterocycles, in each case substituted or unsubstituted; preferably a group selected from nitrogen-comprising heterocycles, more particularly HALS groups.

$X^4$ here assumes the role of the stabilizing group. The reagents (C) are to a very large extent available commercially (e.g., 2,2,6,6-tetramethylpiperidinol or 1,2,2,6,6-penta-methylpiperidinol) or are obtainable from these commercially available compounds by standard methods of organic synthesis.

Particular examples of phenol groups are sterically hindered phenol groups, for example phenol groups substituted by one or two isopropyl groups or tert-butyl groups in the ortho position relative to the phenolic OH group. Particularly preferred examples of phenol groups are

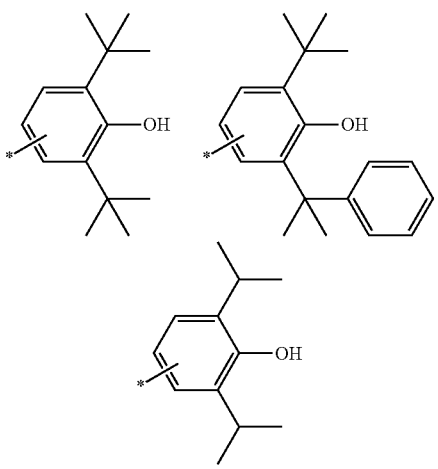

A very particularly preferred example of a phenol group is the 3-(3,5-di-tert-butyl-4-hydroxyphenyl)propionic acid group.

Particular examples of benzophenone groups are

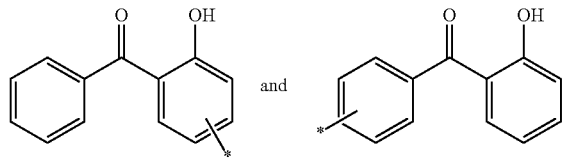

Examples of aromatic amines are

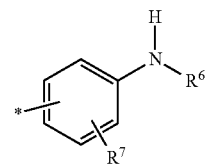

the variables being defined as follows:

$R^6$ has been selected from hydrogen, $C_1$-$C_{12}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl;

more preferably $C_1$-$C_4$ alkyl, such as methyl, ethyl, n-propyl, isopropyl, n-butyl, isobutyl, sec-butyl, and tert-butyl, $C_3$-$C_{12}$ cycloalkyl, such as cyclopropyl, cyclobutyl, cyclopentyl, cyclohexyl, cycloheptyl, cyclooctyl, cyclononyl, cyclodecyl, cycloundecyl, and cyclododecyl; preferably cyclopentyl, cyclohexyl, and cycloheptyl, $C_6$-$C_{14}$ aryl, for example 1-naphthyl, 2-naphthyl, 1-anthracenyl, 2-anthracenyl, 9-anthracenyl and in particular phenyl, benzyl.

$R^7$ has been selected from hydrogen, $C_1$-$C_4$ alkyl, methyl, ethyl, n-propyl, isopropyl, n-butyl, isobutyl, sec-butyl, and tert-butyl.

Nitrogen-comprising heterocycles can be aromatic, monounsaturated or saturated. Nitrogen-comprising heterocycles can comprise one, two or three nitrogen atoms and can bear one or more substituents; in the case of aromatic heterocycles, preference is given to one or more hydroxyphenyl substituents.

Examples of aromatic heterocycles are benzotriazoles and triazines, in particular those of the formulae

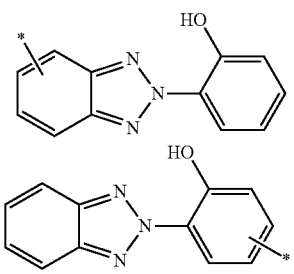

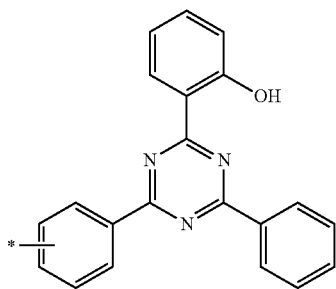

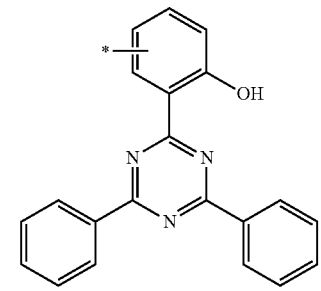

which may each bear one or more further substituents, for example hydroxyl or $C_1$-$C_4$ alkyl, in particular tert-butyl, also $C(CH_3)_2(C_6H_5)$ or $C(CH_3)_2OH$ or perfluoro-$C_1$-$C_4$ alkyl, in particular $CF_3$ or n-$C_4F_9$. Specific examples of nitrogen-comprising aromatic heterocycles having one or more substituents are

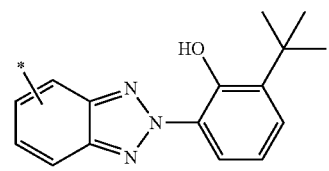

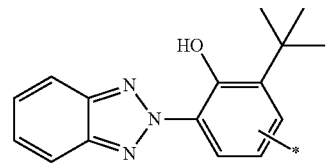

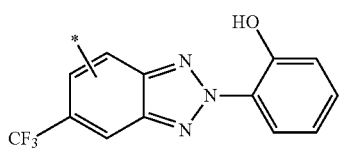

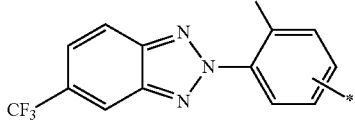

Particular examples of saturated nitrogen-comprising heterocycles are the substituents which are known as HALS (hindered amine light stabilizers) and have the formula II a or the formula II b,

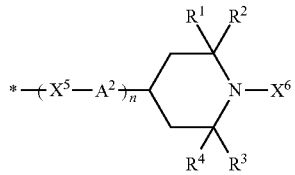

IIa

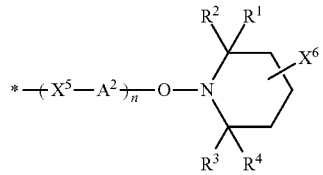

IIb the variables being defined as follows:

$R^1$, $R^2$, $R^3$, and $R^4$ are identical or different and are, independently of one another, $C_1$-$C_{12}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$ alkyl such as methyl, ethyl, n-propyl, isopropyl, n-butyl, isobutyl, sec-butyl or tert-butyl, and in particular each of $R^1$, $R^2$, $R^3$, and $R^4$ is identical and is methyl, $C_3$-$C_{12}$ cycloalkyl, such as cyclopropyl, cyclobutyl, cyclopentyl, cyclohexyl, cycloheptyl, cyclooctyl, cyclononyl, cyclodecyl, cycloundecyl, and cyclododecyl; preferably cyclopentyl, cyclohexyl, and cycloheptyl, or in each case $R^1$ and $R^2$ and/or $R^3$ and $R^4$, together with the carbon atom to which they are jointly attached, form a 4- to 8-membered ring, $X^5$ is an oxygen atom, a sulfur atom, an NH group, an N—($C_1$-$C_4$ alkyl) group, a carbonyl group, preferably an oxygen atom, $A^2$ is a single bond or a spacer. Examples of spacers $A^2$ are para-phenylene, meta-phenylene, preferably $C_1$-$C_{20}$ alkylene, branched or unbranched, where in each case one to 6 nonadjacent $CH_2$ groups can if appropriate be replaced by a sulfur atom, including oxidized forms, or an oxygen atom. Mention may be made by way of example of the following spacers:
—$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{12}$—, —$(CH_2)_{14}$—, —$(CH_2)_{16}$—, —$(CH_2)_{18}$—, —$(CH_2)_{20}$—, —$CH_2$—$CH(CH_3)$—, —$CH_2$—$CH(C_2H_5)$—, —$CH_2$—$CH(CH[CH_3]_2)$—, —$CH_2$—$CH(n$-$C_3H_7)$—, —$[CH(CH_3)]_2$—, —$CH(CH_3)$—$CH_2$—$CH_2$—$CH(CH_3)$—, —$CH(CH_3)$—$CH_2$—$CH(CH_3)$—, —$CH_2$—$C(CH_3)_2$—$CH_2$—, —$CH_2$—$CH(n$-$C_4H_9)$—, —$CH_2$—$CH(iso$-$C_3H_7)$—, —$CH_2$—$CH(tert$-$C_4H_9)$—,
—$CH_2$—O—, —$CH_2$—O—$CH_2$—, —$(CH_2)_2$—O—$(CH_2)_2$—, —$[(CH_2)_2$—$O]_2$—$(CH_2)_2$—, —$[(CH_2)_2$—$O]_3$—$(CH_2)_2$—,
—$CH_2$—S—, —$CH_2$—S—$CH_2$—, —$(CH_2)_2$—S—$(CH_2)_2$—, —$[(CH_2)_2$—$S]_2$—$(CH_2)_2$—, —$[(CH_2)_2$—$S]_3$—$(CH_2)_2$—, —$CH_2$—SO—$CH_2$—, —$CH_2$—$SO_2$—$CH_2$—, preferred spacers $A^2$ being $C_2$-$C_{10}$ alkylene groups, branched or unbranched, such as —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—;

preferably $A^2$ is a single bond, n is zero or one, $X^6$ is hydrogen, oxygen,

O—$C_1$-$C_{19}$ alkyl, preferably $C_1$-$C_6$ alkoxy groups such as methoxy, ethoxy, n-propoxy, isopropoxy, n-butoxy, isobutoxy, sec-butoxy, tert-butoxy, n-pentoxy, isopentoxy, n-hexoxy, and isohexoxy, more preferably methoxy or ethoxy, $C_1$-$C_{12}$ alkyl, preferably methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$ alkyl such as methyl, ethyl, n-propyl, isopropyl, n-butyl, isobutyl, sec-butyl, and tert-butyl, $C_2$-$C_{18}$ acyl, for example acetyl, propionyl, butyryl, benzoyl, stearyl, or aryloxycarbonyl having 7 to 12 C atoms, for example $C_6H_5$—OCO.

Examples of particularly well-suited HALS compounds (stabilizing additives) on which the abovementioned stabilizing compounds of the formula IIa or IIb may be based are 4-amino-2,2,6,6-tetramethylpiperidine,
4-amino-1,2,2,6,6-pentamethylpiperidine,
4-hydroxy-2,2,6,6-tetramethylpiperidine,
4-hydroxy-1,2,2,6,6-pentamethylpiperidine,
4-butylamino-2,2,6,6-tetramethylpiperidine,
4-butylamino-1,2,2,6,6-pentamethylpiperidine,
4-amino-2,2,6,6-tetramethylpiperidine-N-oxyl,
4-hydroxy-2,2,6,6-tetramethylpiperidine-N-oxyl,
4-butylamino-2,2,6,6-tetramethylpiperidine-N-oxyl,
4-hydroxy-2,2,6,6-tetramethyl-1-octoxypiperidine,
4-amino-2,2,6,6-tetramethyl-1-octoxypiperidine,
4-butylamino-2,2,6,6-tetramethyl-1-octoxypiperidine Very particularly suitable are 4-amino-2,2,6,6-tetramethylpiperidine, 4-amino-1,2,2,6,6-pentamethylpiperidine, 4-hydroxy-2,2,6,6-tetramethylpiperidine, 4-hydroxy-1,2,2,6,6-pentamethylpiperidine, 4-amino-2,2,6,6-tetramethylpiperidine-N-oxyl, and 4-hydroxy-2,2,6,6-tetramethylpiperidine-N-oxyl.

In one preferred embodiment of the mixture of the invention the hyperbranched polycarbonate comprising HALS compounds is obtained by reacting a mixture comprising:

(A) one or more polyhydric alcohols,
(B) one or more carbonates,
(C) one or more HALS compounds comprising a functional group reacting with (A) and/or (B).

More particularly suitable are also HALS compounds of the general formula (III):

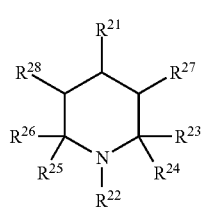

(III)

in which
$R^{21}$ is OH, SH, NHR or $NH_2$,
$R^{22}$ is H, $C_1$-$C_{22}$ alkyl, $C_1$-$C_8$ alkoxy,
$R^{23}$, $R^{24}$, $R^{25}$, and $R^{26}$ independently of one another, identically or differently, are $C_1$-$C_{22}$ alkyl, or $R^{23}$ and $R^{24}$ and/or $R^{25}$ and $R^{26}$ together with the carbon atom to which they are attached form a 4-, 5-, 6-, 7- or 8-membered ring, $R^{27}$ and $R^{28}$ independently of one another, identically or differently, are H or $C_1$-$C_{22}$ alkyl and $R^{21}$ reacts with (A) and/or (B).

With very particular preference $R^{21}$=OH, $R^{22}$=$R^{23}$=$R^{24}$=$R^{25}$=$R^{26}$=methyl, and $R^{27}$=$R^{28}$=H.

In one embodiment of the present invention, mixtures of the invention comprise hyperbranched polycarbonates with stabilizing groups, a characteristic feature of which is that these polycarbonates have a dynamic viscosity in the range from 100 to 150 000 mPa·s, preferably up to 10 000 mPa·s, determined at 23° C., for example in accordance with DIN 53019.

In one embodiment of the present invention, mixtures of the invention comprise hyperbranched polycarbonates with stabilizing groups, a characteristic feature of which is that these polycarbonates have a number average molecular weight ($M_n$) of from 100 to 15 000 g/mol, preferably from 200 to 12 000 g/mol and in particular from 400 to 10 000 g/mol, which can be determined, for example, by means of GPC, polymethyl methacrylate (PMMA) as standard and dimethylacetamide as eluent.

In one embodiment of the present invention, mixtures of the invention comprise hyperbranched polycarbonates with stabilizing groups, a characteristic feature of which is that these polycarbonates have a glass transition temperature $T_g$ in the range from −70 to 10° C., determined by differential thermoanalysis (differential scanning calorimetry).

In one embodiment of the present invention, mixtures of the invention comprise hyperbranched polycarbonates with stabilizing groups, a characteristic feature of which is that these polycarbonates have an OH number in the range from 0 to 600 mg KOH/g, preferably from 1 to 550 mg KOH/g and in particular from 1 to 500 mg KOH/g (in accordance with DIN 53240, part 2).

In one preferred embodiment of the present invention, mixtures of the invention comprise hyperbranched polycarbonates with stabilizing groups, with the characteristic feature that these polycarbonates have a dynamic viscosity in the range from 100 to 150 000 mPa·s, preferably to 10 000 mPa·s, determined at 23° C., in accordance for example with DIN 53019, and that these polycarbonates have a number-average molecular weight ($M_n$) of 100 to 15 000, preferably of 200 to 12 000, and more particularly of 400 to 10 000 g/mol, which can be determined, for example, by means of GPC, polymethyl methacrylate (PMMA) as standard and dimethylacetamide as eluent, and that these polycarbonates have a glass transition temperature $T_g$ in the range from −70° C. to 10° C., determined by differential thermoanalysis (differential scanning calorimetry), and that these polycarbonates have an OH number in the range from 0 to 600, preferably 1 to 550, and more particularly from 1 to 500 mg KOH/g (in accordance with DIN 53240, part 2).

For the preparation of hyperbranched polycarbonate it is also possible optionally to add one or more compounds (D) having two alcoholic hydroxyl groups per molecule, for which the abbreviated term compounds (D) is also used. Examples of suitable compounds (D) comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3-5-trimethyl-cyclohexane, resorcinol, hydroquinone, 4,4'-dihydroxyphenyl, bis-(4-bis(hydroxyphenyl)sulfide, bis(4-hydroxyphenyl) sulfone, bis(hydroxymethyl)benzene, bis(hydroxymethyl) toluene, bis(p-hydroxyphenyl)methane, bis(p-hydroxyphenyl)ethane, 2,2-bis(p-hydroxyphenyl)propane, 1,1-bis(p-hydroxy-phenyl)cyclohexane, dihydroxybenzophenone, bifunctional polyether polyols based on ethylene oxide, propylene oxide, butylene oxide, or a mixture thereof, polytetrahydrofuran, polycaprolactone, or polyesterols based on diols and dicarboxylic acids.

In another embodiment, hyperbranched polycarbonates comprised in the mixtures of the invention can comprise not only the functional groups already obtained by means of the reaction (hydroxyl groups, carbonate groups or carbamoyl chloride groups) but also one or more further functional groups. The functionalization can be effected during the molecular-weight-increase process, or subsequently, i.e., after the actual poly-condensation is at an end.

If components which have not only hydroxyl or carbonate groups but also further functional groups or functional elements are added before or during the actual formation of the polycarbonates by polycondensation, a hyperbranched polycarbonate polymer having randomly distributed functionalities different from the carbonate, carbamoyl chloride or hydroxyl groups is obtained.

By way of example, these effects can be achieved by adding, during polycondensation, compounds bearing not only hydroxyl groups, carbonate groups or carbamoyl chloride groups but also further functional groups or functional elements, such as mercapto groups, primary, secondary or tertiary amino groups, ether groups, carboxylic acid groups or derivatives thereof, sulfonic acid groups or derivatives thereof, phosphonic acid groups or derivatives thereof, silane groups, siloxane groups, aryl radicals or long-chain alcohol radicals. Examples of compounds that can be used for modification by means of carbamate groups are ethanolamine, propanolamine, isopropanolamine, 2-(butylamino)ethanol, 2-(cyclohexylamino)ethanol, 2-amino-1-butanol, 2-(2'-amino-ethoxy)ethanol, or higher alkoxylation products of ammonia, 4-hydroxypiperidine, 1-hydroxyethylpiperazine, diethanolamine, dipropanolamine, diisopropanolamine, tris (hydroxymethyl)aminomethane, tris(hydroxyethyl)aminomethane, ethylenediamine, propylenediamine, hexamethylenediamine, or isophoronediamine.

An example of a compound that can be used for modification by mercapto groups is mercaptoethanol. Tertiary amino groups can be produced by, for example, incorporation of triethanolamine, tripropanolamine, N-methyldiethanolamine, N-methyl-dipropanolamine or N,N-dimethylethanolamine. Ether groups can, for example, be generated by cocondensation of bifunctional or higher-functional polyetherols. Addition of dicarboxylic acids, tricarboxylic acids, dicarboxylic esters, for example dimethyl terephthalate, or tricarboxylic esters can produce ester groups. Reaction with long-chain alkanols or alkanediols can introduce long-chain alkyl radicals. Reaction with alkyl or aryl diisocyanates generates polycarbonates which have alkyl, aryl and urethane groups, and addition of primary or secondary amines leads to introduction of urethane or urea groups.

Subsequent functionalization can be obtained by reacting the hyperbranched poly-carbonate according to the invention in an additional process step with a suitable functionalization reagent which can react with the OH and/or carbonate or carbamoyl chloride groups of the polycarbonate.

Inventive hyperbranched polycarbonates comprising hydroxyl groups can, for example, be modified by addition of molecules comprising acid groups or comprising isocyanate groups. By way of example, polycarbonates comprising acid groups can be obtained by reaction with compounds comprising anhydride groups. Furthermore, inventive hyperbranched polycarbonates comprising hydroxyl groups can also be converted to high-functionality polycarbonate polyether polyols by reaction with alkylene oxides, for example ethylene oxide, propylene oxide or butylene oxide.

A preferred procedure in the preparation of hyperbranched polycarbonates comprising stabilizing groups (b) mixes
(A) at least one compound having at least three alcoholic hydroxyl groups per molecule
(B) with at least one reagent of the general formula I,
(C) with at least one reagent of the general formula $X^3$-$(A^1)_m$-$X^4$
(D) and, if appropriate, with at least one compound having two alcoholic hydroxyl groups per molecule
and heats the mixture to a temperature in the range from 60 to 260° C., preferably 80 to 220° C.

The reaction of compound (A) with reagent (B) and reagent (C) can be carried out in one step. However, it can also be carried out in two steps, and, by way of example, compound (A) can firstly be reacted with reagent (B) to produce a hyperbranched polycarbonate and this can then be functionalized with reagent (C).

In the reaction with reagent (B), H—$X^1$ and H—$X^2$ are usually eliminated. When H—$X^1$ and/or H—$X^2$ are/is hydrogen halide, in particular HCl, the hydrogen halide(s) eliminated is/are preferably removed from the reaction mixture by addition of a base, for example in equimolar amounts based on hydrogen halide to be eliminated. Suitable bases are, for example, alkali metal hydroxides or organic amines, in particular tertiary amines, such as triethylamine and Hünig base (diisopropylethylamine). When H—$X^1$ and H—$X^2$ are alcohols, the alcohol(s) H—$X^1$ and H—$X^2$ eliminated is/are preferably removed by distillation, preferably during the reaction. The removal by distillation can be carried out at atmospheric pressure or under reduced pressure, for example at 0.1 to 950 mbar, in particular at 100 to 900 mbar. The distillation is preferably carried out at atmospheric pressure.

The preparation process of the hyperbranched polycarbonates comprising stabilizing groups (b) can be carried out in the presence of an organic solvent which is preferably aprotic. Examples are decane, dodecane, or solvent naphtha, also aromatic hydro-carbons, such as toluene, ethylbenzene, one or more isomeric xylenes, or chlorinated aromatic hydrocarbons, such as chlorobenzene. Also suitable are ethers having a sufficiently high boiling point, for example di-n-butyl ether or 1,4-dioxane. Further suitable solvents are N,N-dimethylformamide and N,N-dimethylacetamide. However, the preparation of the hyperbranched polycarbonates comprising stabilizing groups (b) is preferably carried out without use of solvents.

The preparation process of the hyperbranched polycarbonates comprising stabilizing groups (b) can be carried out in the presence of a catalyst or a catalyst mixture. Suitable catalysts are compounds which catalyze esterification or transesterification reactions, for example alkali metal hydroxides, alkali metal carbonates, alkali metal hydrogencarbonates, preferably of sodium, potassium or cesium, or organic amines, in particular tertiary amines, guanidines, ammonium compounds, phosphonium compounds, organic compounds of aluminum, tin, zinc, titanium, zirconium or bismuth, and also double metal cyanide (DMC) catalysts as described, for example, in DE 10138216 or DE 10147712.

Preference is given to use of potassium hydroxide, potassium carbonate, potassium hydrogencarbonate, sodium hydroxide, sodium carbonate, sodium hydrogencarbonate, 1,4-diazabicyclo[2.2.2]octane (DABCO), diazabicyclononene (DBN), diazabicyclo-undecene (DBU), imidazoles, such as imidazole, 1-methylimidazole or 1,2-dimethyl-imidazole, titanium tetra-n-butylate, titanium tetraisopropylate, dibutyltin oxide, dibutyltin dilaurate, tin dioctoate, zirconium acetylacetonate, or mixtures thereof.

The amount added of the catalyst or catalyst mixture is generally from 50 to 10 000 ppm by weight, preferably from 100 to 5000 ppm by weight, based on the amount of compound (A) used or the entirety of (A) and (D).

In general the hyperbranched polycarbonates comprising stabilizing groups (b) are prepared in a pressure range from 0.1 mbar to 20 bar, preferably at 1 mbar to 5 bar.

The preparative process is for example carried out in reactors or reactor cascades which are operated batchwise, semicontinuously or continuously, for example in one or more tanks.

A hyperbranched polycarbonate can be prepared using:
from 10 to 59 mol % of compound (A), preferably from 10 to 55 mol %, and more preferably up to 49 mol %, of compound (A),
from 40 to 60 mol % of reagent (B), preferably from 45 to 55 mol %, and more preferably about 50 mol %, of reagent (B),
from 1 to 50 mol % of reagent (C), preferably up to 45 mol %, and more preferably up to 40 mol %, of reagent (C),
in each case based on the total reaction mixture of (A), (B), and (C).

The amount of the compound or compounds (D) used is normally from 0 to 50 mol %, based on the compound (A), preferably from 0 to 45 mol %, more preferably up to 40 mol %, and very preferably from 0 to 30 mol %.

By virtue of the abovementioned setting of the reaction conditions and, if appropriate, by virtue of the selection of the suitable solvent, hyperbranched polycarbonates comprising stabilizing groups (b) and obtained in the form of crude product can be further processed after the preparation process, without further purification.

The hyperbranched polycarbonate according to the invention obtained as crude product can additionally be stripped, i.e., freed of low molecular weight, volatile compounds. For this purpose, the catalyst can optionally be deactivated after the desired conversion has been reached and the low molecular weight volatile constituents, e.g., monoalcohols, phenols, carbonates, hydrogen chloride, or volatile oligomeric or cyclic compounds, can be removed by distillation, if appropriate with introduction of a gas, preferably nitrogen, carbon dioxide or air, if appropriate under reduced pressure.

There are various possible ways of stopping the intermolecular polycondensation reaction of the preparative process of the hyperbranched polycarbonates comprising stabilizing groups (b). For example, the temperature can be reduced to a range in which the reaction ceases and the hyperbranched polycarbonate is storage-stable. In another embodiment, the catalyst or catalyst mixture can be deactivated—in the case of basic catalysts by, for example, addition of an acidic component, a Lewis acid, for example, or an organic or inorganic protic acid.

The reaction can also be stopped automatically when the number of terminal functional groups available for further reaction becomes insufficient by virtue of reaction with reagent (C).

Moreover, as soon as a hyperbranched polycarbonate is present with the desired degree of polycondensation, the reaction can be stopped by adding a product with groups reactive toward hyperbranched polycarbonate comprising stabilizing groups (b). By way of example, a mono-, di- or polyamine can be added or, for example, a mono-, di- or polyisocyanate, a compound comprising epoxy groups, or an acid derivative which is reactive with OH groups.

Particularly preferred as component (b) of the mixtures of the invention are those hyperbranched carbonates, comprising stabilizing groups, in which as many as possible, and particularly all, of the substituents, symbols, and indices adopt their preferred or particularly preferred definition.

In a further preferred embodiment of the mixture of the invention the branched polymer comprises urethane, allophanate, urea, biuret, uretdione, amide, isocyanurate, carbodiimide, uretonimine, oxadiazinetrione or iminooxadiazinedione groups and is referred to in the context of the present invention as a branched polyisocyanate. Preferably there are urethane, allophanate, urea and/or biuret groups comprised.

Di- and polyisocyanates comprise an average of from 2 to 10, preferably from 2.1 to 10, more preferably from 2.2 to 8, isocyanate groups per molecule. Polyfunctional isocyanates are di- or polyisocyanates or their mixtures.

Di- and polyisocyanates which are suitable are the prior-art aliphatic, cycloaliphatic, and aromatic isocyanates or mixtures thereof. Preferred di- or polyisocyanates are diphenylmethane 4,4'-diisocyanate, diphenylmethane 2,4'-diisocyanate, the mixtures composed of monomeric diphenylmethane diisocyanates and of oligomeric diphenyl-methane diisocyanates (polymeric MDI), tolylene 2,4-diisocyanate, tolylene 2,6-diisocyanate, naphthylene 1,5- and 2,6-diisocyanate, phenylene 1,3- and 1,4-diisocyanate, diphenyl diisocyanate, toluidine diisocyanate, triisocyanatotoluene, tetramethylene diisocyanate, hexamethylene diisocyanate, isophorone diisocyanate, methylenebis(cyclohexyl) 2,4'- or 4,4'-diisocyanate, o-, m-, or p-xylylene diisocyanate, tetramethylxylylene diisocyanate, dodecyl diisocyanate, lysine alkyl ester diisocyanate, where alkyl is $C_1$ alkyl to $C_{10}$ alkyl, 2,2,4- or 2,4,4-trimethylhexamethylene 1,6-diisocyanate, 1,4-diisocyanatocyclohexane, 4-isocyanatomethyloctamethylene 1,8-diisocyanate, 2-butyl-2-ethylpentamethylene diisocyanate, 2-isocyanatopropylcyclohexyl isocyanate, 3(4)-isocyanatomethyl-1-methylcyclohexyl isocyanate, 1,3- or 1,4-bis-(isocyanatomethyl) cyclohexane, 1,4-diisocyanato-4-methylpentane, and 4-methyl-cyclohexane 1,3-diisocyanate (H-TDI).

It is preferable to use mixtures composed of two or more of the above-mentioned polyisocyanates.

Suitable branched polyisocyanates are compounds which can be prepared from the abovementioned di- or polyisocyanates or their mixtures via linking by means of urethane, allophanate, urea, biuret, uretdione, amide, isocyanurate, carbodiimide, uretonimine, oxadiazinetrione, or iminooxadiazinedione structures. These linking mechanisms are described for example in Becker and Braun, Kunststoff-Handbuch Nr. 7 [ Plastics Handbook No. 7], Polyurethane [Polyurethanes], Carl-Hanser-Verlag Munich 1993. It is preferable to use polyisocyanates which contain urethane structures, allophanate structures, urea structures, biuret structures, isocyanurate structures, uretonimine structures, oxadiazinetrione structures, or iminoxadiazinedione structures.

It is also possible to use mixtures of the abovementioned branched polyisocyanates as a basis for component (b) of the mixture of the invention.

The linkage of the di-or polyisocyanates by way of urethane groups takes place for example with use of alcohols or alcohol mixtures whose functionality is 2 or greater. By way of example, mention may be made of the reaction of 3 mol of hexamethylene diisocyanate, isophorone diisocyanate, tolylene diisocyanate, or diphenylmethylene diisocyanate with ≤1 mol of triol, such as glycerol or trimethylolpropane, or else the reaction of two mol of an oligomeric diphenylmethane diisocyanate (polymeric MDI) with ≤1 mol of diol, such as ethylene glycol, butanediol, hexanediol, or with a polyoxy-alkylenediol. These reactions form branched polyisocyanates whose functionality is greater than 2. In this connection see also Becker and Braun, Kunststoff-Handbuch Nr. 7 [ Plastics Handbook No. 7], Polyurethane [Polyurethanes], Carl-Hanser-Verlag Munich 1993, page 91.

Polyisocyanates comprising allophanate groups are produced from polyisocyanates comprising urethane groups by reacting the urethane groups with further isocyanate groups. In this connection, see also Becker and Braun, Kunststoff-Handbuch Nr. 7 [ Plastics Handbook No. 7], Polyurethane [Polyurethanes], Carl-Hanser-Verlag Munich 1993, page 94. Another preparation route is the reaction of oxadiazinetriones with alcohols according to EP 825211. By way of example for the preparation of an allophanate, mention may be made of the reaction of hexamethylene diisocyanate or isophorone diisocyanate with monoalcohols, which according to GB 994 890, EP 496 208, EP 524 500, or EP 524 501 give oligoisocyanates whose functionality is greater than 2. Mention may also be made of the reaction of hexamethylene diisocyanate or isophorone diisocyanate with di- or polyhydric alcohols, as described by way of example in EP 1122273. These reactions form branched polyisocyanates having functionality greater than 2.

By way of example, polyisocyanates comprising urea groups and comprising biuret groups may be prepared via reactions of isocyanates with water or with amines. In this connection see also Becker and Braun, Kunststoff-Handbuch Nr. 7 [ Plastics Handbook No. 7], Polyurethane [Polyurethanes], Carl-Hanser-Verlag Munich 1993, page 95. By way of example, mention may be made of the reaction of hexamethylene diisocyanate or isophorone diisocyanate with water or with water-generating substances, as are described in DE-A 28 08 801, DE-A 34 03 277, or DE-A 15 43 178. These reactions form branched polyisocyanates having functionality greater than 2.

Polyisocyanates comprising isocyanurate structures are obtained by catalytic or thermal cyclization of three isocyanate groups. If di- or polyisocyanates are used as starting compounds, the products are generally not only the actual trimers but also higher oligomeric polyisocyanates. The overall functionality of these polyisocyanates is therefore greater than 3. In this connection see also Becker and Braun, Kunststoff-Handbuch Nr. 7 [ Plastics Handbook No. 7], Polyurethane [Polyurethanes], Carl-Hanser-Verlag Munich 1993, page 91. By way of example, mention may be made of the preparation of branched polyisocyanates via isocyanuratization of hexamethylene diisocyanate or of isophorone diisocyanate, a possible method for which is that according to DE-A 29 16 201 or DE-A 38 10 908.

Polyisocyanates comprising uretonimine groups are obtained via further reaction of isocyanate groups with polyisocyanates comprising carbodiimide groups. In this connection see also Becker and Braun, Kunststoff-Handbuch Nr. 7 [ Plastics Handbook No. 7], Polyurethane [Polyurethanes], Carl-Hanser-Verlag Munich 1993, page 94.

Polyisocyanates comprising oxadiazinetrione groups are obtained via reaction of di- or polyisocyanates with carbon dioxide, as described for example in DE-A 16 70 666.

Polyisocyanates comprising iminooxadiazinedione groups can be regarded as asymmetric relatives of the polyisocyanates comprising isocyanurate groups. The preparation of these compounds is described for example in DE-A 197 34 048.

Preferably use is made of aliphatic or cycloaliphatic branched di- or polyisocyanates which comprise isocyanurate, urethane, allophanate, urea or biuret groups.

The branched polyisocyanates comprised in the mixtures of the invention comprise one or more stabilizing groups, with stabilized additives corresponding to the stabilizing groups being coupled to the polyisocyanates via functional groups which are able to react chemically with the NCO groups of the polyisocyanates and in so doing to form a covalent bond.

One class of stabilizing groups which act as antioxidants are sterically hindered phenol groups. Corresponding sterically hindered phenol groups have already been described above for the case of the hyperbranched polycarbonates and are also used for the case of the branched polyisocyanates. The sterically hindered phenol groups preferred in the case of the hyperbranched polycarbonates are also preferred in the case of the branched polyisocyanates.

A further group of stabilizing groups which function as light stabilizers are based on HALS compounds. Corresponding HALS groups or HALS compounds have already been described above for the case of the hyperbranched polycarbonates and are also used for the case of the branched polyisocyanates. The HALS groups or HALS compounds preferred in the case of the hyperbranched polycarbonates are also preferred in the case of the branched polyisocyanates.

A further group of stabilizing groups are aromatic amine groups. Corresponding aromatic amine groups have already been described above for the case of the hyperbranched polycarbonates and are also used for the case of the branched polyisocyanates. The aromatic amine groups preferred in the case of the hyperbranched polycarbonates are also preferred in the case of the branched polyisocyanates.

In a further embodiment of the mixture of the invention the branched polyisocyanates comprise two different stabilizing groups, one of these groups being based on sterically hindered phenols and the other being based on HALS compounds.

The branched polyisocyanates comprising stabilizing groups are typically prepared by way of a polyaddition reaction such that at least one branched polyisocyanate as anchor group is introduced as an initial charge in a reaction vessel, if appropriate with the further use of an organic solvent, under an inert gas atmosphere, preferably under nitrogen, and this initial charge is brought to reaction temperature with stirring. Subsequently, at reaction temperature, at least one stabilizing group is added continuously or discontinuously. The amount of stabilizing group is dependent on the number of NCO groups of the branched polyisocyanate and is preferably selected such that the ratio of the molar number of isocyanate groups to the molar number of groups of the active substance that are reactive therewith is substantially 1:1. Where two or more active substances are reacted simultaneously or successively with the poly-isocyanate, the total amount of the reactive groups of the active substances is made such that it corresponds substantially to the total amount of the isocyanate groups. The branched polyisocyanates thus prepared, comprising stabilizing groups, may, however, also have up to 20 mol %, preferably up to 10 mol %, of free NCO groups, i.e., NCO groups which have not been consumed by reaction with the stabilizing group. Preferably, however, the stabilizers of the invention have substantially no free NCO groups.

The reaction time is generally selected such that the NCO groups of the branched polyisocyanates are reacted completely with the reactive groups of the stabilizing group. The aforementioned reaction with the stabilizing groups and the auxiliaries may take place, if appropriate, in the presence of catalysts, which are used in amounts of 0.0001% to 1% by weight, more particularly of 0.001% to 0.1% by weight, based in each case on the amount of the branched polyisocyanates. Suitable catalysts for polyaddition reactions include organometallic compounds, especially organotin, organozinc, organotitanium, organobismuth or organozirconium compounds. Particular preference is given to using, for example, dibutyltin dilaurate, dibutyltin oxide, titanium tetrabutylate, zinc acetylacetonate or zirconium acetylacetonate. Additionally it is possible to use strong bases, preferably nitrogen compounds, such as tributylamine, quinuclidine, diazabicyclooctane, diazabicyclononane, diazabicyclononene, diaza-bicycloundecane or diazabicycloundecene.

Suitable solvents which can be used are those which are inert toward the reactants under reaction conditions. Suitability is possessed for example by acetone, 2-butanone, ethyl acetate, butyl acetate, tetrahydrofuran, dioxane, benzene, toluene, xylene, ethyl-benzene, chlorobenzene, dichlorobenzene, dimethylformamide, dimethylacetamide or N-methylpyrrolidone.

The reaction temperature for the polyaddition reaction is typically −10 to 220° C., preferably 0 to 180° C. The reaction takes place both at atmospheric pressure and at a pressure above or else below atmospheric pressure, such as, for example, at a pressure of 2 to 20 bar or at 0.1 to 0.001 bar.

In one embodiment of the present invention, mixtures of the invention comprise branched polyisocyanates with stabilizing groups, of which a characteristic feature is that these polyisocyanates have a dynamic viscosity in the range from 100 to 150 000 mPa·s, preferably up to 10 000 mPa·s, determined at 40° C., in analogy for example to DIN 53019.

In one embodiment of the present invention, mixtures of the invention comprise branched polyisocyanates with stabilizing groups, a characteristic feature of which is that these polyisocyanates have a number-average molecular weight ($M_n$) of 100 to 15 000, preferably of 200 to 12 000, and more particularly of 400 to 10 000 g/mol, which can be determined, for example, by GPC, polymethyl methacrylate (PMMA) as standard and tetrahydrofuran as eluent.

In one preferred embodiment of the present invention, mixtures of the invention comprise branched polyisocyanates having stabilizing groups, a characteristic feature of which is that these polyisocyanates have a dynamic viscosity in the range from 100 to 150 000 mPa·s, preferably up to 10 000 mPa·s, determined at 40° C., in analogy for example to DIN 53019, and that these polyisocyanates have a number-average molecular weight ($M_n$) of 100 to 15 000, preferably of 200 to 12 000, and more particularly of 400 to 10 000 g/mol, which can be determined, for example, by GPC, polymethyl methacrylate (PMMA) as standard and tetrahydrofuran as eluent.

In one embodiment of the mixture of the invention the polymer used as branched polymer comprising stabilizing groups is the polymer obtained by the reaction of a mixture comprising:
(A') one or more polyfunctional isocyanates,
(B') one or more HALS compounds comprising a functional group reacting with (A'),
(C') inert solvent or mixtures of inert solvents,
(D') optionally catalyst.

In this system the isocyanate (A') preferably has a functionality of more than 2 and more preferably the isocyanate (A') is an oligomeric isocyanate based on hexa-methylene diisocyanate or isophorone diisocyanate.

Preferably, furthermore, the HALS compound (B') is a compound of the above-described general formula (III) where $R^{21}$ reacts with the polyfunctional isocyanate (A') or with the NCO groups of the branched polyisocyanate.

With very particular preference $R^{21}$=OH, $R^{22}$=$R^{23}$=$R^{24}$=$R^{25}$=$R^{26}$=methyl, and $R^{27}$=$R^{28}$=H.

The inert solvent (C') is preferably acetone, 2-butanone, tetrahydrofuran, ethyl acetate or butyl acetate.

The optional catalyst (D') is preferably dibutyltin dilaurate, dibutyltin oxide or titanium tetrabutylate.

In the mixtures of the invention component (c) may further comprise optionally one or more additions.

Optional further additions (c)

Optionally the mixture of the invention comprises as component (c), or the inanimate organic material to be stabilized by the mixture comprises, in addition, at least one further light stabilizer and/or further (co)stabilizers. Suitable light stabilizers and further (co)stabilizers are selected, for example, from groups a) to s):
a) 4,4-diarylbutadienes,
b) cinnamic esters,
c) benzotriazoles,
d) hydroxybenzophenones,
e) diphenylcyanoacrylates,
f) oxamides,
g) 2-phenyl-1,3,5-triazines,
h) antioxidants,
i) nickel compounds,
j) sterically hindered amines not attached as stabilizing groups to branched polymer,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds, and
s) basic costabilizers.

Group a) of the 4,4-diarylbutadienes includes for example compounds of the formula (aa)

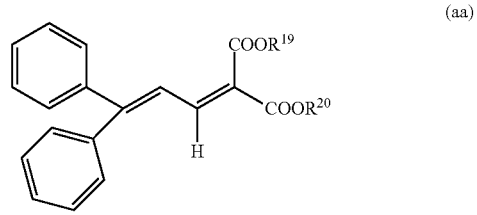

(aa)

The compounds are known from EP-A-916 335. The substituents $R^{19}$ and $R^{20}$, independently of one another, identically or differently, are preferably $C_1$-$C_8$ alkyl and $C_5$-$C_8$ cycloalkyl.

Group b) of the cinnamic esters includes for example 2-isoamyl 4-methoxycinnamate, 2-ethylhexyl 4-methoxycinnamate, methyl α-methoxycarbonylcinnamate, methyl α-cyano-β-methyl-p-methoxycinnamate, butyl α-cyano-β-methyl-p-methoxycinnamate, and methyl α-methoxycarbonyl-p-methoxycinnamate.

Group c) of the benzotriazoles includes for example 2-(2'-hydroxyphenyl)benzo-triazoles such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl) phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-secbutyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)benzo-triazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol]; the product of esterifying 2-[3'-tert-butyl-5'-(2-methoxycarbonylethyl)-2'-hydroxyphenyl]-2H-benzotriazole with polyethylene glycol 300; [R—CH2CH2-COO(CH2)3]2 where R=3'-tert-butyl-4'-hydroxy-5'-2H-benzotriazol-2-ylphenyl and mixtures thereof.

Group d) of the hydroxybenzophenones includes for example 2-hydroxybenzophenones such as 2-hydroxy-4-methoxybenzophenone, 2,2'-dihydroxy-4-methoxybenzophenone, 2,4-dihydroxybenzophenone, 2,2',4,4'-tetrahydroxybenzo-phenone, 2,2'-dihydroxy-4,4'-dimethoxybenzophenone, 2,2'-dihydroxy-4,4'-dimethoxy-benzophenone, 2-hydroxy-4-(2-ethylhexyloxy)benzophenone, 2-hydroxy-4-(n-octyloxy)-benzophenone, 2-hydroxy-4-methoxy-4'-methylbenzophenone, 2-hydroxy-3-carboxy-benzophenone, 2-hydroxy-4-methoxybenzophenone-5-sulfonic acid and its sodium salt, and 2,2'-dihydroxy-4,4'-dimethoxybenzophenone-5,5'-bissulfonic acid and its sodium salt.

Group e) of the diphenylcyanoacrylates includes for example ethyl 2-cyano-3,3-diphenylacrylate, obtainable commercially for example under the name Uvinul® 3035 from BASF AG, Ludwigshafen, 2-ethylhexyl 2-cyano-3,3-diphenylacrylate, obtainable commercially for example as Uvinul® 3039 from BASF AG, Ludwigshafen, and 1,3-bis[(2'-cyano-3',3'-diphenylacryloyl)oxy]-2,2-bis{[2-cyano-3',3'-diphenyl-acryloyl)oxy]methyl}propane, obtainable commercially for example under the name Uvinul® 3030 from BASF AG, Ludwigshafen.

Group f) of the oxamides includes for example 4,4'-dioctyloxyoxanilide, 2,2'-di-ethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, and also mixtures of ortho-, para-methoxy-disubstituted oxanilides and mixtures of ortho- and para-ethoxy-disubstituted oxanilides.

Group g) of the 2-phenyl-1,3,5-triazines includes for example 2-(2-hydroxyphenyl)-1,3,5-triazines such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxy-phenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-butyloxy-propoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/-tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, and 2-(2-hydroxyphenyl)-4-(4-methoxyphenyl)-6-phenyl-1,3,5-triazine.

Group h) of the antioxidants comprises, for example:

Alkylated monophenols such as, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butyl-phenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, unbranched or sidechain-branched nonylphenols such as, for example, 2,6-dinonyl-4-methylphenol, 2,4-dimethyl-6-(1-methylundec-1-yl)phenol, 2,4-dimethyl-6-(1-methylheptadec-1-yl)-phenol, 2,4-dimethyl-6-(1-methyltridec-1-yl)phenol, and mixtures thereof.

Alkylthiomethylphenols such as, for example, 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol.

Hydroquinones and alkylated hydroquinones such as, for example, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, and bis-(3,5-di-tert-butyl-4-hydroxyphenyl) adipate.

Tocopherols, such as, for example, α-tocopherol, β-tocopherol, γ-tocopherol, δ-tocopherol, and mixtures thereof (vitamin E).

Hydroxylated thiodiphenyl ethers such as, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), and 4,4'-bis(2,6-dimethyl-4-hydroxyphenyl)disulfide.

Alkylidenebisphenols such as, for example, 2,2'-methylenebis(6-tert-butyl-4-methyl-phenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutyl-phenol), 2,2'-methylenebis[6-(α-methylbenzyl)-4-nonylphenol], 2,2'-methylenebis-[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methyl-phenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3-tert-butyl-4-hydroxyphenyl)butyrate], bis(3-tert-butyl-4-hydroxy-5-methylphenyl)dicyclo-pentadiene, bis[2-(3'-tert-butyl-2-hydroxy-5-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis-(5-tert-butyl-4-hydroxy- 2-methylphenyl)-4-n-dodecyl-mercaptobutane, 1,1,5,5-tetra-(5-tert-butyl-4-hydroxy-2-methylphenyl)pentane.

Benzyl compounds such as, for example, 3,5,3',5'-tetra-tert-butyl-4,4'-dihydroxy-dibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)-amine, 1,3,5-tri(3,5-di-tert-butyl-4-hydroxybenzyl)-2,4,6-trimethylbenzene, di(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl)dithiol terephthalate, 1,3,5-tris (3,5-di-tert-butyl-4-hydroxybenzyl) isocyanurate, 1,3,5-tris (4-tert-butyl-3-hydroxy-2,6-dimethylbenzyl) isocyanurate, 3,5-di-tert-butyl-4-hydroxybenzyl-phosphoric acid dioctadecyl ester, and 3,5-di-tert-butyl-4-hydroxybenzyl-phosphoric acid monoethyl ester, calcium salt.

Hydroxybenzylated malonates such as, for example, dioctadecyl 2,2-bis(3,5-di-tert-butyl-2-hydroxybenzyl)malonate, dioctadecyl-2-(3-tert-butyl-4-hydroxy-5-methylbenzyl)-malonate, didodecyl mercaptoethyl-2,2-bis(3,5-di-tert-butyl-4-hydroxybenzyl)malonate, and bis[4-(1,1,3,3-tetramethylbutyl)phenyl]2,2-bis(3,5-di-tert-butyl-4-hydroxybenzyl)-malonate.

Hydroxybenzyl aromatics such as, for example, 1,3,5-tris (3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, and 2,4,6-tris(3,5-di-tert-butyl-4-hydroxybenzyl)phenol.

Triazine compounds such as, for example, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxy-phenylethyl)-1,3,5-triazine, 1,3,5-tris(3,5-di-tert-butyl-4-hydroxyphenylpropionyl)-hexahydro-1,3,5-triazine, and 1,3,5-tris(3,5-dicyclohexyl-4-hydroxybenzyl)isocyanurate.

Benzylphosphonates such as, for example, dimethyl 2,5-di-tert-butyl-4-hydroxy-benzylphosphonate, diethyl 3,5-di-tert-butyl-4-hydroxybenzylphosphonate (diethyl (3,5-bis(1,1-dimethylethyl)-4-hydroxyphenyl)methylphosphonate), dioctadecyl 3,5-di-tert-butyl-4-hydroxybenzylphosphonate, dioctadecyl 5-tert-butyl-4-hydroxy-3-methyl-benzylphosphonate, and the calcium salt of monoethyl 3,5-di-tert-butyl-4-hydroxy-benzylphosphonate.

Acylaminophenols such as, for example, 4-hydroxylauranilide, 4-hydroxystearanilide, 2,4-bisoctylmercapto-6-(3,5-tert-butyl-4-hydroxyanilino)-s-triazine, and octyl N-(3,5-di-tert-butyl-4-hydroxyphenyl)carbamate.

Esters of β-(3,5-di-tert-butyl-4-hydroxyphenyl)propionic acid with monohydric or polyhydric alcohols, such as with methanol, ethanol, n-octanol, isooctanol, octa-decanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, and 4-hydroxymethyl-1-phospha-2,6,7-trioxabicyclo[2.2.2]octane.

Esters of β-(5-tert-butyl-4-hydroxy-3-methylphenyl)propionic acid with monohydric or polyhydric alcohols, such as with methanol, ethanol, n-octanol, isooctanol, octa-decanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, and 4-hydroxymethyl-1-phospha-2,6,7-trioxabicyclo[2.2.2]octane.

Esters of β-(3,5-dicyclohexyl-4-hydroxyphenyl)propionic acid with monohydric or polyhydric alcohols, such as with methanol, ethanol, octanol, octadecanol, 1,6-hexane-diol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, and 4-hydroxymethyl-1-phospha-2,6,7-trioxa-bicyclo[2.2.2]octane.

Esters of 3,5-di-tert-butyl-4-hydroxyphenylacetic acid with monohydric or polyhydric alcohols, such as with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, and 4-hydroxymethyl-1-phospha-2,6,7-trioxa-bicyclo[2.2.2]octane.

Amides of β-(3,5-di-tert-butyl-4-hydroxyphenyl)propionic acid, such as N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxy-phenyl] propionyloxy)ethyl]oxamide (e.g., Naugard®XL-1 from Uniroyal).

Ascorbic acid (vitamin C)

Amine antioxidants, such as, for example, N,N'-diisopropyl-p-phenylenediamine, N,N'-di-sec-butyl-p-phenylenediamine, N,N'-bis(1,4-dimethylpentyl)-p-phenylene-diamine, N,N'-bis(1-ethyl-3-methylpentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example, p,p'-di-tert-octyldiphenylamine, 4-n-butylaminophenol, 4-butyrylaminophenol, 4-nonanoyl-aminophenol, 4-dodecanoylaminophenol, 4-octadecanoylaminophenol, bis (4-methoxy-phenyl)amine, 2,6-di-tert-butyl-4-dimethylaminomethylphenol, 2,4'-diaminodiphenyl-methane, 4,4'-diaminodiphenylmethane, N,N,N',N'-tetramethyl-4,4'-diaminodiphenyl-methane, 1,2-bis[(2-methylphenyl)amino] ethane, 1,2-bis(phenylamino)propane, o-tolyl biguanide, bis [4-(1',3'-dimethylbutyl)phenyl]amine, tert-octylated N-phenyl-1-naphthyl-amine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, 2,2,6,6-tetramethylpiperidin-4-one, 2,2,6,6-tetramethylpiperidin-4-ol, the dimethyl succinate polymer with 4-hydroxy-2,2,6,6-tetramethyl-1-piperidineethanol [CAS number 65447-77-0], (for example, Tinuvin® 622 from Ciba Specialty Chemicals, Inc.), polymer of 2,2,4,4-tetramethyl-7-oxa-3,20-diazadispiro[5.1.11.2]heneicosan-21-one and epichlorohydrin [CAS No.: 202483-55-4], for example (Hostavin® N 30 from Clairant).

Group i) of the nickel compounds includes for example nickel complexes of 2,2'-thiobis[4-(1,1,3,3-tetramethylbutyl) phenol], such as the 1:1 or 1:2 complex, with or without additional ligands such as n-butylamine, triethanolamine or N-cyclohexyl-diethanolamine, nickel dibutyl dithiocarbamate, nickel salts of 4-hydroxy-3,5-di-tert-butylbenzylphosphonic acid monoalkyl esters such as of the methyl or ethyl esters, for example, nickel complexes of ketoximes such as, for example, of 2-hydroxy-4-methyl-phenyl undecyl ketoxime, and the nickel complex of 1-phenyl-4-lauroyl-5-hydroxy-pyrazole, with or without additional ligands.

Group j) of the sterically hindered amines includes for example 4-hydroxy-2,2,6,6-tetra-methylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-penta-methyl-4-piperidyl)n-butyl-3,5-di-tert-butyl-4-hydroxybenzylmalonate (n-butyl-3,5-di-tert-butyl-4-hydroxybenzylmalonic acid bis(1,2,2,6,6-pentamethylpiperidyl)ester), condensation product of 1-(2-hydroxyethyl)-2,2,6,6-tetramethyl-4-hydroxypiperidine and succinic acid, linear or cyclic condensation products of N,N'-bis(2,2,6,6-tetra-methyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetra-methyl-4-piperidyl) 1,2,3,4-butanetetracarboxylate, 1,1'-(1,2-ethanediyl)bis-(3,3,5,5-tetramethylpiperazinone), 4-benzoyl-2,2,6,6-tetramethylpiperidine, 4-stearyl-oxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-tri-azaspiro[4.5] decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-bis(4-n-butylamino-2,2,6,6-tetramethylpiperidyl)-1,3,5-triazine and 1,2-bis(3-aminopropylamino)ethane, condensation product of 2-chloro-4,6-di-(4-n-butylamino-1,2,2,6,6-pentamethylpiperidyl)-1,3,5-triazine and 1,2-bis(3-aminopropylamino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis-(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecyl-succinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro [4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxy-phenyl)ethene, diester of 4-methoxymethylenemalonic acid with 1,2,2,6,6-pentamethyl-4-hydroxypiperidine, poly[methylpropyl-3-oxo-4-(2,2,6,6-tetramethyl-4-piperidyl)]-siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetra-methylpiperidine and a carbon radical of t-amyl alcohol, 1-(2-hydroxy-2-methyl-propoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetra-methylpiperidin-4-yl)sebacate, bis(1-(2-hydroxy-2-methylpropoxy)-2,2,6,6-tetra-methylpiperidin-4-yl)adipate, bis(1-(2-hydroxy-2-methylpropoxy)-2,2,6,6-tetramethyl-piperidin-4-yl)succinate, bis(1-(2-hydroxy-2-methylpropoxy)-2,2,6,6-tetramethyl-piperidin-4-yl)glutarate, 2,4-bis{N[1-(2-hydroxy-2-methylpropoxy)-2,2,6,6-tetramethylpiperidin-4-yl]-N-butylamino}-6-(2-hydroxyethylamino)-s-triazine, hexahydro-2,6-bis(2,2,6,6-tetramethyl-4-piperidyl)-1H,4H,5H,8H-2,3a,4a,6,7a,8a-hexaazacyclopenta-[def]fluorene-4,8-dione (e.g. Uvinul® 4049 from BASF AG, Ludwigshafen), poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) [CAS No. 71878-19-8], 1,3,5-triazine-2,4,6-triamine, N,N'''-[1,2-ethanediylbis-[[4,6-bis [butyl(1,2,2,6,6-pentamethyl-4-piperidinyl)amino]-1,3,5-triazin-2-yl]imino]-3,1-propanediyl]]bis[N',N''-dibutyl-N',N''-bis(1,2,2,6,6-pentamethyl-4-piperidinyl) (CAS No. 106990-43-6) (e.g., Chimassorb 119 from Ciba Specialty Chemicals, Inc.).

Group k) of the metal deactivators includes for example N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl-bisphenyl hydrazide, N,N'-diacetyladipic dihydrazide, N,N'-bis(salicyloyl)oxalic dihydrazide, and N,N'-bis(salicyloyl)thiopropionyl dihydrazide.

Group l) of the phosphites and phosphonites includes for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-dibenzo[d,f][1,3,2]dioxaphosphepine, 6-fluoro-2,4,8,10-tetra-tert-butyl-12-methyldibenzo[d,g][1,3,2] dioxaphosphocine, bis(2,4-di-tert-butyl-6-methylphenyl) methyl phosphite, bis(2,4-di-tert-butyl-6-methylphenyl) ethyl phosphite, 2,2',2''-nitrilo-[triethyl tris(3,3',5,5'-tetra-tert-butyl-1,1'-biphenyl-2,2'-diyl)phosphite], and 2-ethylhexyl-(3,3',5,5'-tetra-tert-butyl-1,1-biphenyl-2,2'-diyl)phosphite.

Group m) of the hydroxylamines includes for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecyl-hydroxylamine, N-hexadecyl-N-octadecylhydroxylamine, N-heptadecyl-N-octadecyl-hydroxylamine, N-methyl-N-octadecylhydroxylamine, and N,N-dialkylhydroxylamine from hydrogenated tallow fatty amines.

Group n) of the nitrones includes for example N-benzyl α-phenyl nitrone, N-ethyl α-methyl nitrone, N-octyl α-heptyl nitrone, N-lauryl α-undecyl nitrone, N-tetradecyl α-tridecyl nitrone, N-hexadecyl α-pentadecyl nitrone, N-octadecyl α-heptadecyl nitrone, N-hexadecyl α-heptadecyl nitrone, N-octadecyl α-pentadecyl nitrone, N-heptadecyl α-heptadecyl nitrone, N-octadecyl α-hexadecyl nitrone, N-methyl α-heptadecyl nitrone, and nitrones derived from N,N-dialkylhydroxylamines prepared from hydrogenated talc fatty amines.

Group o) of the amine oxides includes for example amine oxide derivatives as described in U.S. Pat. Nos. 5,844,029 and 5,880,191, didecylmethylamine oxide, tridecylamine oxide, tridodecylamine oxide, and trihexadecylamine oxide.

Group p) of the benzofuranones and indolinones includes for example those described in U.S. Pat. Nos. 4,325,863; 4,338,244; 5,175,312; 5,216,052; 5,252,643; in DE-A-4316611; in DE-A-4316622; in DE-A-4316876; in EP-A-0589839 or EP-A-0591102, or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxy-phenyl)benzofuran-2-one, 3-(4-acetoxy-3,5-dimethylphenyl)-5,7-di-tert-butyl-benzo-furan-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, Irganoxs HP-136 from Ciba Specialty Chemicals, and 3-(2,3-dimethylphenyl)-5,7-di-tert-butyl-benzofuran-2-one.

Group q) of the thiosynergists includes for example dilauryl thiodipropionate or distearyl thiodipropionate.

Group r) of the peroxide-destroying compounds includes for example esters of β-thiodipropionic acid, for example, the lauryl, stearyl, myristyl or tridecyl ester, mercaptobenzimidazole or the zinc salt of 2-mercaptobenzimidazole, zinc dibutyldithio-carbamate, dioctadecyl disulfide, and pentaerythritol tetrakis(β-dodecylmercapto)-propionate.

Group s) of the basic costabilizers includes for example melamine, polyvinyl-pyrrolidone, dicyandiamide, triallylcyanurate, urea derivatives, hydrazine derivatives, amines, polyamides, polyurethanes, alkali metal and alkaline earth metal salts of higher fatty acids, for example, calcium stearate, zinc stearate, magnesium behenate, magnesium stearate, sodium ricinoleate, and potassium palmitate, antimony pyrocatecholate or zinc pyrocatecholate.

The mixture of the invention, as component (c), or the plastic may further comprise other additives and additions t). Suitable additives from the group t) are the customary additives, such as pigments, dyes, nucleating agents, fillers, reinforcing agents, antifogging agents, biocides, and antistats, for example.

Suitable pigments are inorganic pigments, examples being titanium dioxide in its three modifications—rutile, anatase or brookite; ultramarine blue, iron oxides, bismuth vanadates or carbon black, and also the class of the organic pigments, examples being compounds from the class of the phthalocyanines, perylenes, azo compounds, isoindolines, quinophthalones, diketopyrrolopyrroles, quinacridones, dioxazines, and indanthrones.

By dyes are meant all colorants which dissolve completely in the plastic used or are present in a molecularly disperse distribution and can therefore be used for the high-transparency, nonscattering coloring of polymers. Likewise regarded as dyes are organic compounds which exhibit a fluorescence in the visible part of the electromagnetic spectrum, such as fluorescent dyes.

Suitable nucleating agents include for example inorganic substances, examples being talc, metal oxides such as titanium dioxide or magnesium oxide, phosphates, carbonates or sulfates, preferably of alkaline earth metals; organic compounds such as monocarboxylic or polycarboxylic acids and also their salts, such as 4-tert-butylbenzoic acid, adipic acid, diphenylacetic acid, sodium succinate or sodium benzoate; and polymeric compounds, such as ionic copolymers ("ionomers"), for example.

Suitable fillers and reinforcing agents include for example calcium carbonate, silicates, talc, mica, kaolin, barium sulfate, metal oxides and metal hydroxides, carbon black, graphite, wood flour and flours or fibers of other natural products, and synthetic fibers. Further suitable examples of fibrous or pulverulent fillers include carbon or glass fibers in the form of glass fabrics, glass mats or filament glass rovings, chopped glass, glass beads, and wollastonite. Glass fibers can be incorporated either in the form of short glass fibers or in the form of continuous fibers (rovings).

Examples of suitable antistats include amine derivatives such as N,N-bis(hydroxy-alkyl)alkylamines or -alkylenamines, polyethylene glycol esters and ethers, ethoxylated carboxylic esters and carboxamides, and glyceryl mono- and distearates, and also mixtures thereof.

With preference there are antioxidants, flame retardants and/or colorants comprised as optional component (c) in the mixtures of the invention.

The weight ratio of components (a) and (b) in the mixtures of the invention is generally from 5:1 to 1:5, preferably from 2:1 to 1:2, more preferably from 1.2:1 to 1:1.2, with more particular preference being given to a mixture in the weight ratio of approximately 1:1.

If component (c) is present, the weight ratio of the sum of components (a) and (b) to component (c) in the mixtures of the invention is generally from 100:1 to 2:1, preferably from 50:1 to 5:1, more preferably from 30:1 to 7:1, more particular preference being given to a mixture in the weight ratio of approximately 10:1.

The mixtures of the invention can be prepared by known processes familiar to the skilled worker.

For example, if component (b) is a solid, component (b) can be added to the liquid component (a) with mixing.

If component (b) is itself liquid, then processes known to the skilled worker for the mixing of liquids can be used for mixing it with the liquid component (a).

In one preferred embodiment the mixture of the invention is liquid.

Generally speaking the components (a), (b), and, optionally, (c) can be mixed in any order.

For example, component (c) can be added to the mixture of components (a) and (b), and the resulting mixture can then be homogenized.

Alternatively components (c) may be admixed to (a) and/or (b) first, and then the end mixture produced.

The invention also provides, accordingly, a corresponding process for preparing the mixtures of the invention.

The mixtures of the invention may also only be produced in the inanimate organic materials to be stabilized, by the addition of components (a), (b), and, optionally, (c).

It may be advantageous to carry out the mixing of the components at an elevated temperature. More particularly component (a) and optionally component (c) may be added immediately after the synthesis of component (b).

Particular preference is given to the following combinations of compounds of components (a) and the branched polymers comprising stabilizing groups (b) of the formulae IIa and IIb:

1. 2-Ethylhexyl 2-cyano-3,3-diphenylacrylate and compounds of the formulae IIa or IIb based on 4-amino-2,2,6,6-tetramethylpiperidine,
2. 2-Ethylhexyl 2-cyano-3,3-diphenylacrylate and compounds of the formulae IIa or IIb based on 4-amino-1,2,2,6,6-pentamethylpiperidine,
3. 2-Ethylhexyl 2-cyano-3,3-diphenylacrylate and compounds of the formulae IIa or IIb based on 4-hydroxy-2,2,6,6-tetramethylpiperidine,
4. 2-Ethylhexyl 2-cyano-3,3-diphenylacrylate and compounds of the formulae IIa or IIb based on 4-hydroxy-1,2,2,6,6-pentamethylpiperidine,
5. 2-Ethylhexyl 2-cyano-3,3-diphenylacrylate and compounds of the formulae IIa or IIb based on 4-amino-2,2,6,6-tetramethylpiperidine-N-oxyl,
6. 2-Ethylhexyl 2-cyano-3,3-diphenylacrylate and compounds of the formulae IIa or IIb based on 4-hydroxy-2,2,6,6-tetramethylpiperidine-N-oxyl,
7. 2-Ethylhexyl 4-methoxycinnamate and compounds of the formulae IIa or IIb based on 4-amino-2,2,6,6-tetramethylpiperidine,
8. 2-Ethylhexyl 4-methoxycinnamate and compounds of the formulae IIa or IIb based on 4-amino-1,2,2,6,6-pentamethylpiperidine,
9. 2-Ethylhexyl 4-methoxycinnamate and compounds of the formulae IIa or IIb based on 4-hydroxy-2,2,6,6-tetramethylpiperidine,
10. 2-Ethylhexyl 4-methoxycinnamate and compounds of the formulae IIa or IIb based on 4-hydroxy-1,2,2,6,6-pentamethylpiperidine,
11. 2-Ethylhexyl 4-methoxycinnamate and compounds of the formulae IIa or IIb based on 4-amino-2,2,6,6-tetramethylpiperidine-N-oxyl,
12. 2-Ethylhexyl 4-methoxycinnamate and compounds of the formulae IIa or IIb based on 4-hydroxy-2,2,6,6-tetramethylpiperidine-N-oxyl, The mixtures of the invention are outstandingly suitable for use as stabilizers for stabilizing inanimate organic material against the effect of light, oxygen, and heat. The mixtures of the invention are generally added to the inanimate organic materials to be stabilized at a concentration sufficient to achieve the desired stabilization effect (i.e., the effective amount). The mixtures of the invention are added preferably in a concentration of 0.01% to 5% by weight, more preferably of 0.02% to 1% by weight, based on the inanimate organic material, before, during or after the production of the inanimate organic material.

The invention further provides a method of stabilizing inanimate organic materials, more particularly plastics and coating materials, against the effect of light, oxygen, and heat, which comprises adding the mixtures of the invention to the inanimate organic materials, preferably in the concentrations indicated above.

The mixture of the invention may be added to the inanimate organic material to be protected in the form of a prefabricated mixture of components (a), (b), and, optionally, (c), although it is likewise possible to add components (a), (b), and, optionally, (c) separately to the material to be protected, in which case the mixture is formed only in the material to be protected. In the case where components (a), (b), and, optionally, (c) are added separately they may be added simultaneously or at different times, the sequence of addition generally being immaterial.

By inanimate organic material is meant, for example, cosmetic products such as ointments and lotions, drug formulations such as pills and suppositories, photographic recording material such as photographic emulsions, or intermediates for plastics and coating materials, but more particularly plastic and coating materials themselves. From inanimate organic material it is possible to produce articles.

The invention further provides inanimate organic material, more particularly plastics and coating materials, which are stabilized against the effect of light, oxygen, and heat and which comprise the mixtures of the invention, preferably in the concentrations indicated above.

For the mixing of the mixture of the invention primarily with plastics it is possible to employ all known apparatus and methods of mixing stabilizers or other adjuvants into polymers.

Examples of plastics which can be stabilized by means of the mixtures of the invention include the following:
thermoplastic elastomers;
polymers of mono- and diolefins, such as, for example, low-density and high-density polyethylene, polypropylene, linear polybut-1-ene, polyisoprene, polybutadiene, and copolymers of mono- or diolefins, or mixtures of said polymers;
copolymers of mono- or diolefins with other vinyl monomers, such as, for example, ethylene-alkyl acrylate copolymers, ethylene-alkyl methacrylate copolymers, ethylene-vinyl acetate copolymers or ethylene-acrylic acid copolymers;
polystyrene and also copolymers of styrene or α-methylstyrene with dienes and/or acrylic derivatives, such as, for example, styrene-butadiene, styrene-acrylonitrile (SAN), styrene-ethyl methacrylate, styrene-butadiene-ethyl acrylate, styrene-acrylonitrile-methacrylate, acrylonitrile-butadiene-styrene (ABS) or methyl methacrylate-butadiene-styrene (MBS):
halogenated polymers, such as polyvinyl chloride, polyvinyl fluoride, polyvinylidene fluoride, and their copolymers, for example;
polymers deriving from α,β-unsaturated acids and their derivatives, such as polyacrylates, polymethacrylates, polyacrylamides, and polyacrylonitriles;
polymers deriving from unsaturated alcohols and amines and/or their acrylic derivatives or acetals, such as polyvinyl alcohol and polyvinyl acetate, for example;
polyurethanes, polyamides, polyureas, polyesters, polycarbonates, polysulfones, polyethersulfones, and polyetherketones.

Additionally it is possible to use the mixtures of the invention to stabilize coatings, industrial coatings for example. Particular emphasis among these may be given to baking varnish systems, more particularly vehicle finishes, preferably two-coat finishes. Another field of use is that, for example, of coating materials for the exterior coating of buildings, other constructions or technical apparatus.

The mixtures of the invention may be added in solid or dissolved form to the coating material. In this context their high solubility in coating systems is a particular advantage.

The mixtures of the invention are preferably used to stabilize thermoplastic elastomers, based for example on polyolefins. The mixtures of the invention find use more particularly in the stabilization of molding compounds comprising the stated materials.

Another preferred field of use is the stabilization of low-density and high-density polyethylene, and also of polypropylene and polyamide, including, for example, fibers of said polymers.

Likewise preferred is the use of the mixtures of the invention for stabilizing plastics composed of at least one polymer selected from thermoplastic elastomers, polyolefins, polystyrene, copolymers of styrene or of α-methylstyrene, polyesters and polyethers, polycarbonates, polyvinyl chloride, polyacrylates, polymethacrylates, polyurethanes, and physical blends of the aforementioned polymers.

The mixtures of the invention exhibit improved stabilization of inanimate organic materials with respect to light with a high UV fraction and/or high light intensity. Furthermore, the mixtures of the invention are based on easily accessible starting materials. By means of the mixtures of the invention it is possible to ensure efficient protection of inanimate organic materials with respect to oxygen or heat.

The above embodiments of the process of the invention, and the examples below, exemplarily illustrate the present invention. However, for a person skilled in the art, there are many further variations of the process, and combinations of the features of the process of the invention, that are conceivable without departing the scope of the claims.

EXAMPLES

Example 1

Preparation of Mixtures of the Invention 972 g of trimethylolpropane, randomly etherified with 1 mol of ethylene oxide per mole of hydroxyl groups, 411 g of 1,2,2,6,6-pentamethylpiperidin-4-ol, and 709 g of diethyl carbonate were charged to a reaction vessel equipped with stirrer, reflux condenser, and internal thermometer, and then 0.2 g of potassium carbonate was added and the mixture was heated to 140° C. with stirring and stirred at 140° C. for 3.5 h. Thereafter the reflux condenser was swapped for a descending condenser, ethanol was removed by distillation, and the temperature of the reaction mixture was slowly raised to 200° C. The distillate (490 g) was collected in a cooled, round-bottomed flask. Then the reaction mixture was cooled to 140° C., 0.1 g of 85% strength phosphoric acid was added for deactivation, and the mixture was then freed from volatiles at 100 mbar for 10 min. Subsequently the product was cooled to room temperature and analyzed by gel permeation chromatography; the eluent was dimethylacetamide and the calibration standard used was polymethyl methacrylate (PMMA). The number-average molecular weight, Mn, was 810 g/mol and the weight-average molecular weight, Mw, was 1590 g/mol. The viscosity, determined at 23° C. in accordance with DIN 53019, was 1100 mPas.

500 g of the polycarbonate of the invention comprising stabilizer groups were then heated to 80° C., 500 g of 2-ethylhexyl 2-cyano-3,3-diphenylacrylate (CAS No. 6197-30-4) were added, and the mixture was stirred to homogeneity for 2 h. The viscosity of the stabilizer mixture, determined at 23° C. in accordance with DIN 53019, was 5800 mPas.

Example 2

Preparation of Mixtures of the Invention

A reaction vessel with stirrer, gas inlet tube, and dropping funnel with pressure compensation was charged, under dry nitrogen blanketing, with 588 g of BASONAT® HA 300, in solution in an equal amount by weight of dry 2-butanone, 300 ppm (based on isocyanate) of dibutyltin dilaurate were added at room temperature, and the mixture was heated to 50° C. Then 453.6 g of 1,2,2,6,6-pentamethylpiperidin-4-ol, in solution in the same amount by weight of dry 2-butanone, were added dropwise over the course of 30 min. After the end of the addition the reaction mixture was stirred at 50° C. for 1 h more. Subsequently the solvent was removed under reduced pressure on a rotary evaporator. The average molar masses of the polymeric stabilizer were determined by means of gel permeation chromatography (GPC). Elution was carried out with tetrahydrofuran as the mobile phase, and the columns were calibrated with polymethyl methacrylate as standard. Mn=1060 g/mol, Mw=1190 g/mol.

500 g of the polyurethane of the invention comprising stabilizer groups were then heated to 80° C. in a round-bottomed flask, 500 g of 2-ethylhexyl 2-cyano-3,3-diphenylacrylate (CAS No. 6197-30-4) were added, and the mixture was stirred to homogeneity for 2 h. The viscosity of the stabilizer mixture, determined at 40° C. in accordance with DIN 53019, was 8100 mPas.

BASONAT® HA 300 (BASF AG): allophanate-group-comprising polyisocyanate based on hexamethylene diisocyanate; the viscosity at 23° C. (DIN 53019) is 200-400 mPas.

The invention claimed is:

1. A mixture comprising
   (a) at least one UV absorber which is a liquid substance at a temperature of 5 to 40° C. and a pressure of 500 to 1500 mbar, with the proviso that the mixture of 95% benzene propanoic acid 3-2(2H-benzotriazol-2-yl)-5-(1,1-dimethylethyl)-4-hydroxy-C7-9-branched and linear alkyl esters and 5% 1-methoxy-2-propyl acetate as a liquid UV absorber is excluded,
   (b) at least one branched polymer comprising a stabilizing group, and
   (c) optionally, at least one further addition,
   wherein the at least one branched polymer comprises at least one Hindered Amine Light Stabilizer (HALS) as a stabilizing group and wherein the mixture is liquid at room temperature,
   wherein the at least one UV absorber (a) is selected from the group consisting of cyanoacrylate, cinnamic ester, benzotriazole, and triazine,
   wherein the at least one branched polymer comprising a stabilizing group comprises a hyperbranched structure, and
   wherein the at least one branched polymer comprises a carbonate group.

2. The mixture according to claim 1, wherein the at least one branched polymer comprising a stabilizing group (b) is a liquid substance at room temperature.

3. The mixture according to claim 1, wherein the at least one UV absorber (a) is 2-ethylhexyl 2-cyano-3,3-diphenylacrylate, 2-ethylhexyl 4-methoxycinnamate, or a mixture thereof.

4. The mixture according to claim 1, wherein the at least one branched polymer comprises at least one group selected from the group consisting of a urethane group, an allophanate group, an urea group, and a biuret group.

5. The mixture according to claim 1, further comprising as the optional component (c) at least one member selected from the group consisting of an antioxidant, a flame retardant, and a colorant.

6. A plastic comprising at least one mixture comprising:
   (a) at least one UV absorber which is a liquid substance at a temperature of 5 to 40° C. and a pressure of 500 to 1500 mbar, with the proviso that the mixture of 95% benzene propanoic acid 3-2(2H-benzotriazol-2-yl)-5-(1,1-dimethylethyl)-4-hydroxy-C7-9-branched and linear alkyl esters and 5% 1-methoxy-2-propyl acetate as a liquid UV absorber is excluded, (b) at least one branched polymer comprising a stabilizing group, and (c) optionally, at least one further addition, wherein the at least one branched polymer comprises at least one Hindered Amine Light Stabilizer (HALS) as a stabilizing group and wherein the mixture is liquid at room temperature.

7. An article produced from plastics according to claim 6.

8. A method of stabilizing plastic against the effect of light, oxygen and/or heat, the method comprising adding an effective amount of at least one mixture according to claim 1 to said plastic.

9. The mixture according to claim 1, wherein the at least one UV absorber (a) is a cyanoacrylate.

10. A mixture comprising
(a) at least one UV absorber which is a liquid substance at a temperature of 5 to 40° C. and a pressure of 500 to 1500 mbar, with the proviso that the mixture of 95% benzene propanoic acid 3-2(2H-benzotriazol-2-yl)-5-(1,1-dimethylethyl)-4-hydroxy-C7-9-branched and linear alkyl esters and 5% 1-methoxy-2-propyl acetate as a liquid UV absorber is excluded, (b) at least one branched polymer comprising a stabilizing group, and (c) optionally, at least one further addition, wherein the at least one branched polymer comprises at least one Hindered Amine Light Stabilizer (HALS) as a stabilizing group and wherein the mixture is liquid at room temperature without dispersing or dissolving in a solvent.

11. A mixture comprising
(a) at least one UV absorber which is a liquid substance at a temperature of 5 to 40° C. and a pressure of 500 to 1500 mbar, with the proviso that the mixture of 95% benzene propanoic acid 3-2(2H-benzotriazol-2-yl)-5-(1,1-dimethylethyl)-4-hydroxy-C7-9-branched and linear alkyl esters and 5% 1-methoxy-2-propyl acetate as a liquid UV absorber is excluded, (b) at least one branched polymer comprising a stabilizing group, and (c) optionally, at least one further addition, wherein the at least one branched polymer comprises at least one Hindered Amine Light Stabilizer (HALS) as a stabilizing group and wherein the mixture is a liquid substance at room temperature, and wherein liquid substances are substances which have a dynamic viscosity form 1 to 150,000 mPa.sec.

12. A plastic comprising at least one polyurethane and at least one mixture comprising:
(a) at least one UV absorber which is a liquid substance at a temperature of 5 to 40° C. and a pressure of 500 to 1500 mbar, with the proviso that the mixture of 95% benzene propanoic acid 3-2(2H-benzotriazol-2-yl)-5-(1,1-dimethylethyl)-4-hydroxy-C7-9-branched and linear alkyl esters and 5% 1-methoxy-2-propyl acetate as a liquid UV absorber is excluded, (b) at least one branched polymer comprising a stabilizing group, and (c) optionally, at least one further addition, wherein the at least one branched polymer comprises at least one Hindered Amine Light Stabilizer (HALS) as a stabilizing group and wherein the mixture is liquid at room temperature.

13. The plastic according to claim 12, wherein the at least one UV absorber (a) is selected from the group consisting of cyanoacrylate, cinnamic ester, benzotriazole, and triazine.

14. The plastic according to claim 12, wherein the at least one UV absorber (a) is a cyanoacrylate.

15. The plastic according to claim 12, wherein the at least one branched polymer comprising a stabilizing group comprises a hyperbranched structure, and wherein the at least one branched polymer comprises a carbonate group.

\* \* \* \* \*